(12) United States Patent
Hibi

(10) Patent No.: US 8,052,328 B2
(45) Date of Patent: Nov. 8, 2011

(54) BEARING DEVICE WITH SLIDING BEARING

(75) Inventor: Kenji Hibi, Kuwana (JP)

(73) Assignee: NTN Corporation, Osaka (JP)

( * ) Notice: Subject to any disclaimer, the term of this patent is extended or adjusted under 35 U.S.C. 154(b) by 700 days.

(21) Appl. No.: 11/992,313

(22) PCT Filed: Sep. 21, 2006

(86) PCT No.: PCT/JP2006/318749
§ 371 (c)(1),
(2), (4) Date: Mar. 20, 2008

(87) PCT Pub. No.: WO2007/037169
PCT Pub. Date: Apr. 5, 2007

(65) Prior Publication Data
US 2009/0110339 A1 Apr. 30, 2009

(30) Foreign Application Priority Data

Sep. 27, 2005 (JP) .................. 2005-280610
Sep. 28, 2005 (JP) .................. 2005-281559
Sep. 28, 2005 (JP) .................. 2005-281561
Sep. 30, 2005 (JP) .................. 2005-287564

(51) Int. Cl.
*F16C 3/14* (2006.01)
*F16C 33/20* (2006.01)
*F16C 32/06* (2006.01)

(52) U.S. Cl. ........ 384/322; 384/107; 384/108; 384/286; 384/397

(58) Field of Classification Search ............. 384/100, 384/107, 114, 123, 129, 155, 276, 279, 286, 384/902, 909, 912, 108, 311, 397, 322
See application file for complete search history.

(56) References Cited

U.S. PATENT DOCUMENTS

| 4,738,010 A | | 4/1988 | Ehrfeld et al. | |
| 4,801,252 A | * | 1/1989 | Wrobel | 384/219 |
| 4,806,081 A | * | 2/1989 | Harmsen et al. | 417/354 |
| 5,131,818 A | * | 7/1992 | Wittkop et al. | 417/273 |
| 5,264,748 A | * | 11/1993 | Ootsuka et al. | 384/902 |
| 5,343,104 A | * | 8/1994 | Takahashi et al. | 310/90 |

(Continued)

FOREIGN PATENT DOCUMENTS

CN 1462840 12/2003

(Continued)

OTHER PUBLICATIONS

Chinese Office Action issued Dec. 11, 2009 in corresponding Chinese Application No. 200680044369.6 with English translation.

(Continued)

*Primary Examiner* — Marcus Charles
(74) *Attorney, Agent, or Firm* — Wenderoth, Lind & Ponack, L.L.P.

(57) ABSTRACT

A sliding bearing includes a metal part formed by electroforming on an inner periphery of the sliding bearing and an oil feeding mechanism for supplying oil to the bearing gap. As a result, oil retained by the oil feeding mechanism is supplied to the bearing gap, so the lubricity between the bearing and the shaft member is improved by an oil film formed in the bearing gap. This makes it possible to avoid the generation of noise due to defective lubrication and wear of members due to the contact sliding between the bearing and the shaft member.

1 Claim, 12 Drawing Sheets

U.S. PATENT DOCUMENTS

| | | | |
|---|---|---|---|
| 5,540,504 A | | 7/1996 | Cordova et al. |
| 5,889,461 A | * | 3/1999 | Ebata .......................... 338/160 |
| 5,895,119 A | | 4/1999 | Miyasaka et al. |
| 6,086,257 A | * | 7/2000 | Lee ............................. 384/279 |
| 6,119,346 A | | 9/2000 | Miyasaka et al. |
| 6,139,289 A | * | 10/2000 | Obata et al. .................. 417/420 |
| 6,183,221 B1 | * | 2/2001 | Hsieh ...................... 417/423.12 |
| 6,318,976 B1 | * | 11/2001 | Hsieh ...................... 417/423.12 |
| 6,547,439 B2 | * | 4/2003 | Chen ........................... 384/114 |
| 6,756,714 B2 | * | 6/2004 | Alex et al. .................... 384/286 |
| 6,882,074 B2 | * | 4/2005 | Horng et al. .................... 310/90 |
| 7,011,449 B2 | * | 3/2006 | Shishido et al. ............. 384/107 |
| 7,128,523 B2 | * | 10/2006 | Aizawa et al. ................ 415/111 |
| 2004/0136842 A1 | * | 7/2004 | Obara et al. .................. 417/354 |
| 2004/0232781 A1 | * | 11/2004 | Yoo ................................ 310/51 |
| 2005/0023907 A1 | * | 2/2005 | Neal ............................... 310/43 |
| 2006/0045395 A1 | * | 3/2006 | Shimazu et al. ............. 384/100 |

FOREIGN PATENT DOCUMENTS

| | | | |
|---|---|---|---|
| JP | 61-152813 | | 9/1986 |
| JP | 62-261715 | | 11/1987 |
| JP | 63212518 A | * | 9/1988 |
| JP | 06197487 A | * | 7/1994 |
| JP | 09-151941 | | 6/1997 |
| JP | 09262632 A | * | 10/1997 |
| JP | 2000-120695 | | 4/2000 |
| JP | 2000-352414 | | 12/2000 |
| JP | 2003-056552 | | 2/2003 |
| JP | 2003-230250 | | 8/2003 |
| JP | 2003-343550 | | 12/2003 |
| JP | 2005-042838 | | 2/2005 |

OTHER PUBLICATIONS

International Search Report mailed Dec. 26, 2006 for International Application PCT/JP2006/318749.

* cited by examiner

BEARING DEVICE WITH SLIDING BEARING

BACKGROUND OF THE INVENTION

1. Field of the Invention

The present invention relates to a bearing device equipped with a sliding bearing.

2. Description of Related Art

A sliding bearing (hereinafter simply referred to as "bearing") is widely used to support relative rotation, sliding, or sliding rotation between a bearing and a shaft member.

For example, Patent Document 1 proposes a bearing formed through insert molding using an electrocast metal part at the axial core of a resin-molded part. By thus forming the inner peripheral surface of a bearing constituting a bearing surface by a metal part, it is possible to obtain a bearing surface superior in wear resistance and to set with high precision a bearing gap formed between the bearing surface and a shaft member inserted into the inner periphery thereof.
[Patent Document 1] JP 2003-56552 A

SUMMARY OF THE INVENTION

Problems to be Solved by the Invention

When the bearing as described above is used, for example, to support the rotation shaft of a spindle motor for driving a magnetic disk drive such as an HDD, of which high speed rotation and high rotational accuracy are required, oil lubrication may be required in order to obtain a satisfactory lubrication between the bearing and the shaft member. However, in order to suppress rattling of the shaft member, the bearing gap between the inner peripheral surface of the bearing and the outer peripheral surface of the shaft member is set to a gap width as minute as possible. In particular, when the metal part is formed by electroforming as in the case described above, the bearing gap is set to a very minute gap width in view of the characteristics of electroforming. Thus, the amount of lubricant oil retained in the bearing gap is minimum, so if the lubricant oil is reduced through scattering, evaporation, or the like, defective lubrication is caused due to shortage of lubricant oil, so there is a fear of problems such as generation of noise and wear of members due to the contact sliding between the bearing and the shaft member.

It is an object of the present invention to provide a sliding bearing and a bearing device in which lubrication between the shaft member and the bearing is satisfactory, which help to prevent noise generation or wear of members, and which provide a long product life.

Means for Solving the Problems

In order to achieve the above-mentioned object, according to the present invention, there is provided a bearing device including: a sliding bearing including a metal part formed by electroforming and a resin part formed by molding with the metal part inserted in an inner periphery of the resin part; and a shaft member inserted into an inner periphery of the sliding bearing, with a bearing gap being formed between an inner peripheral surface of the sliding bearing and an outer peripheral surface of the shaft member, in which the bearing device further including an oil feeding mechanism for supplying oil to the bearing gap.

In this way, the bearing device of the present invention has an oil feeding mechanism for supplying oil to the bearing gap. As a result, oil retained by the oil feeding mechanism is supplied to the bearing gap, so the lubricity between the bearing and the shaft member is improved by an oil film formed in the bearing gap, making it possible to avoid generation of noise due to defective lubrication and wear due to the contact sliding between the bearing and the shaft member. In particular, when the metal part is formed by electroforming, the amount of supply oil retained in the bearing gap is minimum, so the provision of this oil feeding mechanism proves effective.

The oil feeding mechanism may be formed, for example, by an oil sump that is in contact with the shaft member. In this case, since the oil sump is in contact with the shaft member, oil is easily supplied to the bearing gap, thereby providing a smoother lubrication. The oil sump can be provided, for example, between the metal part and the shaft member, or in the resin part.

Alternatively, it is also possible to form the oil feeding mechanism by an oil sump formed so as to be spaced apart from the shaft member, supplying oil retained in this oil sump to the bearing gap through a communication hole. Since the oil sump is thus out of contact with the shaft member, there is no fear of the surface area of the bearing surface being encroached upon by the oil sump, and it is possible to avoid deterioration in bearing performance. The communication hole is formed, for example, so as to extend through the metal part.

Alternatively, the oil feeding mechanism may be formed by an oil feeding member formed of an oil-containing metal, oil-containing resin, or the like. By thus supplying oil from an oil feeding member to the bearing gap, oil can be supplied in minute amounts by capillarity, so it is possible to maintain an appropriate oil film in the bearing gap over a long period of time. When this oil feeding member is provided at a position where it is in contact with the shaft member, oil is easily supplied to the bearing gap, and a smoother lubrication can be attained. On the other hand, when the oil feeding member is provided at a position where it is out of contact with the shaft member, and oil is supplied to the bearing gap through the communication hole, there is no fear of the bearing surface area being encroached upon by the oil feeding member, making it possible to avoid deterioration in bearing performance.

The same effect as mentioned above can be attained by using a sliding bearing which includes a metal part and a resin part formed by insert molding with the metal part inserted in the inner periphery thereof, and in which at least a part of the inner peripheral surface is formed by the metal part, with the resin part being formed of oil-containing resin. When this sliding bearing is applied to a bearing device, it is possible to retain oil in the resin part, thereby increasing the oil feeding amount.

A motor equipped with the bearing device as described above, a stator coil, and a rotor magnet operates smoothly, so it involves no noise generation and provides a long product life.

Effects of the Invention

As described above, according to the present invention, it is possible to provide a bearing device in which a satisfactory lubrication is attained between the bearing and the shaft member, which helps to prevent noise generation and wear of members, and which provides a long product life.

Figure 1:
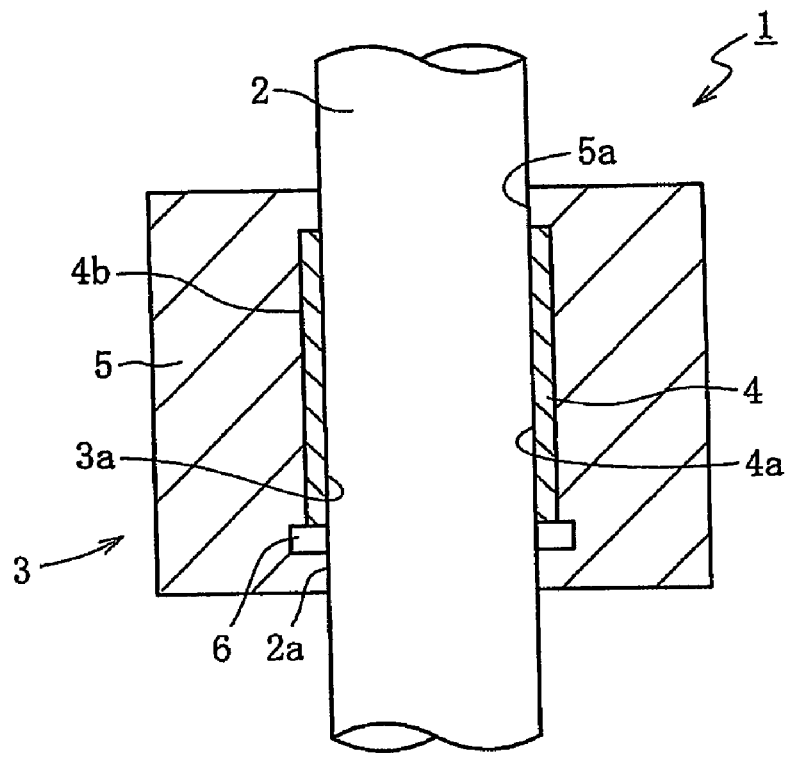
FIG. 1 is a sectional view of a bearing device 1 according to a first embodiment of the present invention.

DESCRIPTION OF SYMBOLS 1 bearing device
2 shaft member
3 sliding bearing
4 metal part
5 resin part
6 oil sump (oil feeding mechanism)
7 master shaft
8 covering material
9 oil sump forming member
10 electrocast shaft
11a movable mold portion
11b stationary mold portion
1000 motor
1003 disk hub
1004 stator coil
1005 rotor magnet
1006 bracket
1007 thrust plate
D disk
P molten resin
R radial bearing portion
T thrust bearing portion

DETAILED DESCRIPTION OF THE INVENTION

In the following, a first embodiment of the present invention will be described with reference to FIGS. 1 through 6.

FIG. 1 is a sectional view of a bearing device 1 according to the first embodiment of the present invention. The bearing device 1 includes a bearing 3, a shaft member 2 inserted into the inner periphery of the bearing 3, and an oil feeding mechanism for supplying oil to a bearing gap formed between an outer peripheral surface 2a of the shaft member 2 and an inner peripheral surface 3a of the bearing 3. There are no particular limitations regarding the configuration and the arrangement position of the oil feeding mechanism. In this embodiment, an oil sump 6 is provided in a resin part 5 as the oil feeding mechanism, and the oil sump 6 is in contact with the shaft member 2.

The bearing 3 is equipped with a metal part 4 formed by electroforming, and the resin part 5 holding the metal part 4 in the inner periphery thereof. An inner peripheral surface 4a of the metal part 4 serves as a bearing surface. The resin part 5 is substantially of a cylindrical configuration and is formed by resin molding.

In the following, a process for producing the bearing 3 will be described. The bearing 3 is produced by the step of effecting masking on a portion of a master shaft 7 where it is required, the step of forming an electrocast shaft 10 by performing electroforming on the non-masked portion (see FIGS. 2 and 3), the step of performing resin injection molding on the metal part 4 of the electrocast shaft 10 (see FIG. 4), and the step of separating the metal part 4 from the master shaft 7 to separate the bearing 3 and the master shaft 7 from each other.

In the following description, the term "rotary bearing" means a bearing for supporting relative rotation between itself and a shaft member, and it does not matter whether the bearing is on the rotary side or on the stationary side. The term "sliding bearing" means a bearing for supporting relative linear movement between itself and a shaft, and, similarly, it does not matter whether the bearing is on the movable side or on the stationary side. A "rotary sliding bearing" is endowed with the functions of the above-mentioned two bearings; it is a bearing for supporting both rotary movement and linear movement between itself and a shaft. The term "rocking bearing" means a bearing permitting three-dimensional movement of a shaft as in the case, for example, of a ball joint.

The master shaft 7 is formed of a conductive material, such as a stainless steel that has undergone quenching, as a straight shaft of a circular cross-sectional configuration. Of course, the material is not restricted to stainless steel; there is selected a material satisfying the requisite properties in terms of the function of the bearing and of the convenience in the production of the bearing, such as mechanical strength like rigidity, slidability, heat resistance, chemical resistance, and workability and releasability of the metal part 4; further, a heat treatment method is selected. A non-metal material such as ceramic can also be used by performing conduction treatment thereon (e.g., by forming a conductive metal coating film thereon). It is desirable to perform on the surface of the master shaft 7 surface treatment for reducing the frictional force between itself and the metal part 4, for example, resin coating with a fluorine-based resin.

The master shaft 7 maybe a solid shaft, a hollow shaft, or a solid shaft with a hollow portion filled with resin. In the case of a rotary bearing, the master shaft is basically formed in a circular cross-sectional configuration, whereas, in the case of a sliding bearing, the bearing may be formed in an arbitrary cross-sectional configuration; apart from a circular one, it may have a polygonal or a non-circular sectional configuration. While in the case of a sliding bearing, the cross-sectional configuration of the master shaft 7 is basically fixed in the axial direction, in the case of a rotary bearing and a rotary sliding bearing, the cross-sectional configuration thereof may not be fixed over the entire length of the shaft.

The surface precision of the outer peripheral surface of the master shaft 7 directly influences the precision of the bearing gap described below, so it is necessary to previously finish the master shaft with high surface precision, with factors that are important in terms of bearing function, such as roundness, cylindricality, and surface roughness being of high level. For example, in the case of a rotary bearing, roundness is regarded as important from the viewpoint of avoiding contact with the bearing surface, so it is necessary to enhance as much as possible the roundness of the outer peripheral surface of the master shaft 7. For example, it is desirable to effect the finishing to a level of not more than 80% of the average width (radial dimension) of the bearing gap described below. Thus, when, for example, setting the average width of the bearing gap to 2 μm, it is desirable for the outer peripheral surface of the master shaft to be finished to a roundness of 1.6 μm or less.

Figure 2:
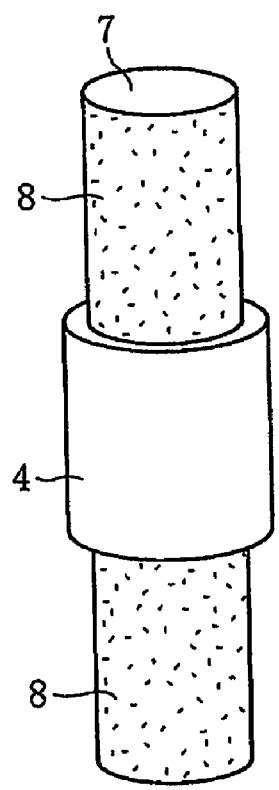
FIG. 2 is a perspective view showing how a metal part 4 is formed on a master shaft 7.

Masking is effected on the outer peripheral surface of the master shaft 7 except for the portion where the metal part 4 is to be formed (as indicated by the dotted pattern in FIG. 2). As a covering material 8 for the masking, there is selected and used an existing product having non-conductivity and corrosion resistance with respect to electrolyte solution.

To perform electroforming, the master shaft 7 is immersed in an electrolyte solution containing ions of metals such as Ni and Cu, and electricity is supplied to the electrolyte solution to thereby cause the target metal to be deposited on the surface of the master shaft 7. The electrolyte solution may contain as needed a sliding material such as carbon or stress mitigating material such as saccharin. The electro-deposited metal is selected as appropriate according to the physical and chemical properties required of the bearing surface of the bearing, such as hardness, wear resistance, and fatigue strength. If the thickness of the metal part 4 is too large, its separability from the master shaft 7 deteriorates, whereas, if it is too small, that will lead to a reduction in the durability of the bearing surface, etc.; thus, the metal part is set to an optimum thickness according to the requisite bearing performance, bearing size, use, etc. For example, in the case of a rotary bearing of a shaft diameter of 1 mm to 6 mm, it is desirable for the thickness to range from 10 μm to 200 μm.

Through the above-mentioned steps, the cylindrical metal part 4 is formed in the outer periphery of the master shaft 7 as shown in FIG. 2. When the covering material 8 for the masking is thin, both ends of the metal part 4 may protrude toward the covering material 8 to form tapered beveled portions on the inner peripheral surface thereof. By utilizing the beveled portions, it is also possible to form flange portions for preventing detachment of the metal part from the resin part. In the case of this embodiment, however, no such beveled portions are formed.

Figure 3:
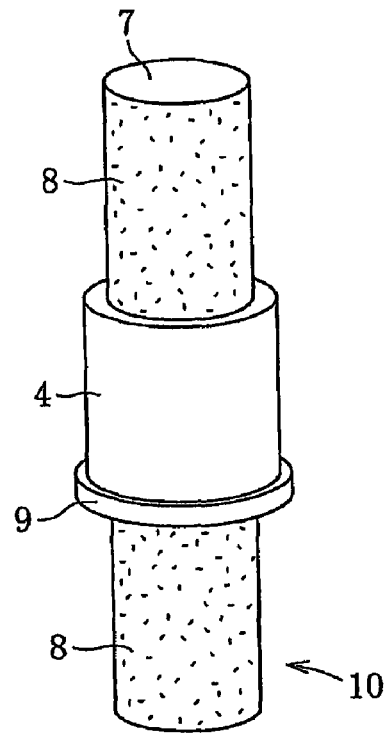
FIG. 3 is a perspective view of an electrocast shaft 10.
Figure 4:
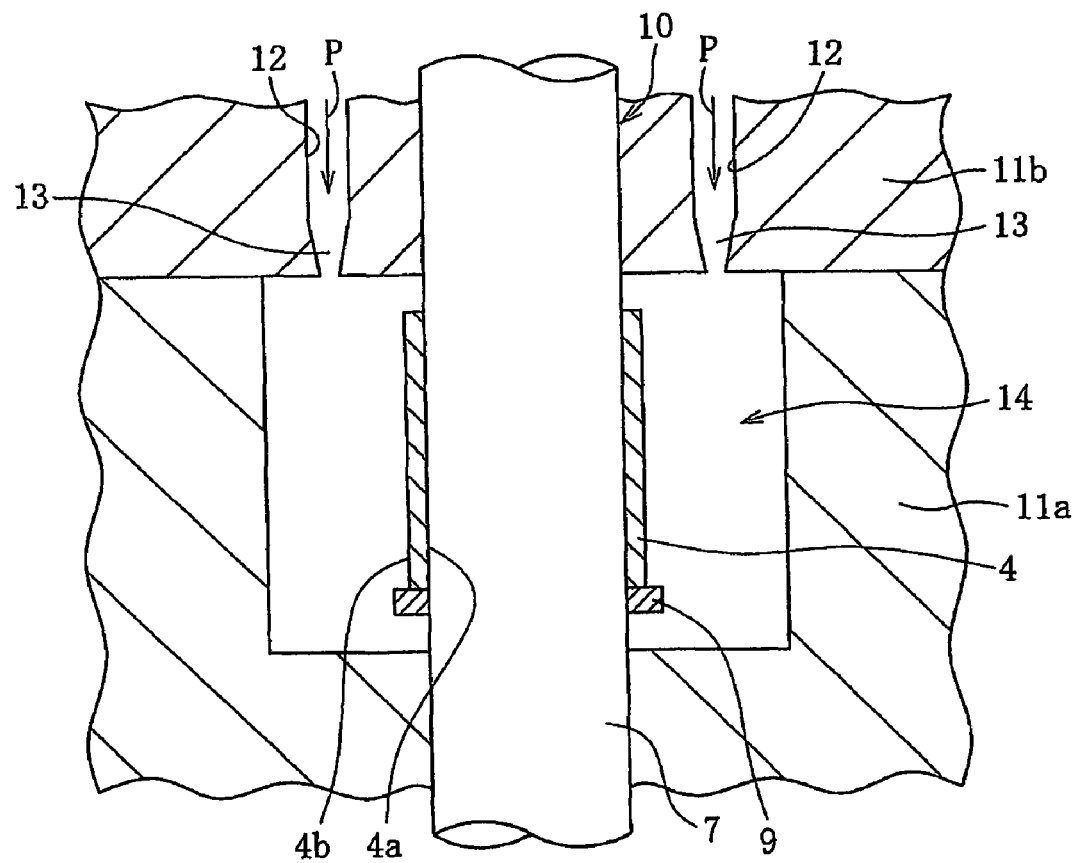
FIG. 4 is a sectional view illustrating how the electrocast shaft 10 is set in a mold for injection molding.
Figure 5:
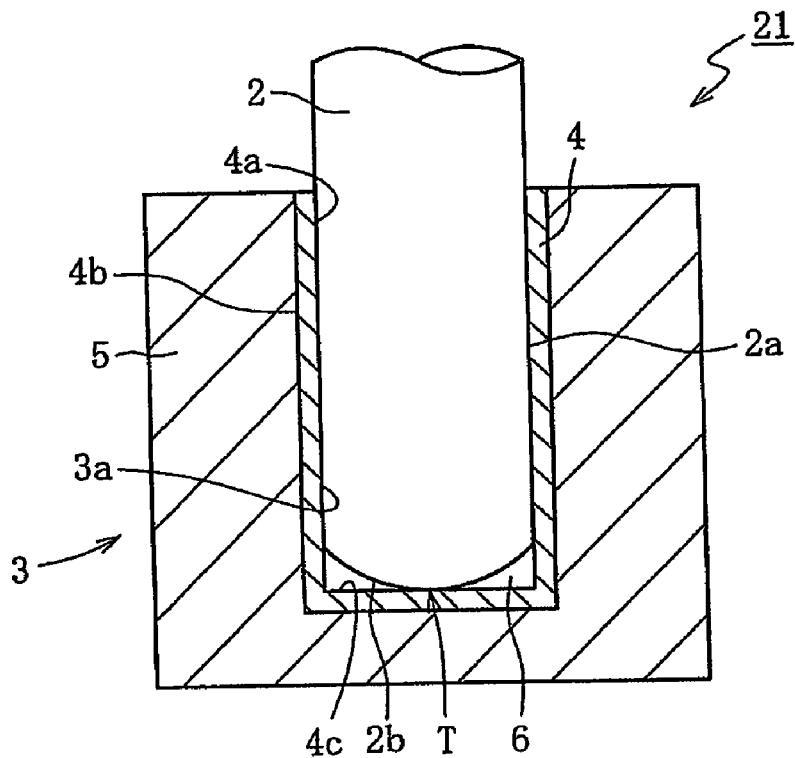
FIG. 5 is a sectional view of a bearing device 21.

After that, as shown in FIG. 3, an oil sump forming member 9 is arranged on the outer peripheral surface of the master shaft 7. There are no particular limitations regarding the configuration of the oil sump forming member 9; apart from the annular one shown in FIG. 3, it is also possible, for example, to provide a plurality of oil sump forming members at positions circumferentially spaced apart from each other. Regarding its sectional configuration, it may be, apart from the rectangular one as shown in FIG. 4, of an arbitrary configuration such as a semi-circular one or a trapezoidal one.

In the case of an annular configuration as shown in FIG. 3, it is desirable for the material of the oil sump forming member 9 to be one that is capable of elastic deformation such as rubber, so it can be detached from the bearing 3 after the separation of the bearing 3 and the master shaft 7 described below. When the configuration of the oil sump forming member 9 is not an annular one, it is possible to use an arbitrary material such as metal or resin, as long as no problem is involved when detaching it from the bearing 3.

There are no particular limitations regarding the position of the oil sump forming member 9 as long as it is within the portion where the resin part 5 is to be formed. For example, it may be arranged adjacent to the metal part 4 as shown in FIG. 3, or axially spaced apart from the metal part 4. Alternatively, it is also possible to form a plurality of metal parts 4 at positions axially spaced apart from each other, arranging the oil sump forming member 9 between the metal parts 4. Further, there are no limitations regarding the number of oil sump forming members arranged; it is possible to arrange a single oil sump forming member as shown in FIG. 3, or arrange a plurality of oil sump forming members.

In the manner as described above, there is formed the electrocast shaft 10 having on the outer peripheral surface of the master shaft 7, the metal part 4 and the oil sump forming member 9. The electrocast shaft 10 is transferred to the injection molding step as illustrated in FIG. 4, where insert molding is effected using the metal part 4, the oil sump forming member 9, and the master shaft 7 as the insert components.

FIG. 4 conceptually illustrates the step of forming the resin part 5 by insert molding; a mold including a movable mold portion 11a and a stationary mold portion 11b is provided with runners 12, gates 13, and a cavity 14. In this embodiment, the gates 13 are dot-like gates, which are formed in the mold (stationary mold portion 11b) at a plurality of (e.g., three) positions at equal circumferential intervals so as to be in correspondence with one axial end surface of the resin part 5. The gate area of the gates 13 is set to an appropriate value in conformity with the viscosity of the molten resin with which the mold is to be filled, and the configuration of the molding.

In the mold constructed as described above, the movable mold portion 11a is brought close to the stationary mold portion 11b to effect clamping, with the electrocast shaft 10 being set at a predetermined position. Next, in the clamped state, molten resin P is injected through a sprue (not shown), the runners 12, and the gates 13 to fill the cavity 14 with the molten resin P, thereby forming the resin part 5 integrally with the electrocast shaft 10.

The molten resin P is made of a thermoplastic resin, for example, it is possible to use: an amorphous resin such as polysulfone (PSF), polyether sulfone (PES), polyphenyl sulfone (PPSU), or polyether imide (PEI); or a crystalline resin such as liquid crystal polymer (LCP), polyetherether ketone (PEEK), polybutyrene terephthalate (PBT), or polyphenylene sulfide (PPS). Further, there are no particular limitations regarding the filler to be used for the above resin. For example, as the filler, it is possible to use: a fibrous filler such as glass fiber; a whisker-like filler such as potassium titanate; a scale-like filler such as mica; or a fibrous or powdered conductive filler such as carbon fiber, carbon black, graphite, carbon nanomaterial, and metal powder. Those fillers may be used singly or in the form of a mixture of two or more of them.

After the opening of the mold, the molding, in which the master shaft 7, the metal part 4, the oil sump forming member 9, and the resin part 5 are integrated with each other, is released from the mold. In the subsequent separating step, this molding is separated into a component formed of the metal part 4, the resin part 5, and the oil sump forming member 9 (see FIG. 1), and the master shaft 7.

In the separating step, the inner stress accumulated in the metal part 4 is released, whereby the inner peripheral surface 4a of the metal part 4 is diverged to thereby separate the metal part 4 from the outer peripheral surface of the master shaft 7. The releasing of the inner stress is effected by imparting an impact to the master shaft 7 or the metal part 4, or by imparting an axial pressurizing force between the inner peripheral surface 4a of the metal part 4 and the outer peripheral surface of the master shaft 7. By releasing the inner stress, the inner peripheral surface of the metal part 4 is radially diverged to thereby form a gap of an appropriate size between the inner peripheral surface 4a of the metal part 4 and the outer peripheral surface of the master shaft 7, whereby the master shaft 7 can be smoothly released in the axial direction from the inner peripheral surface 4a of the metal part 4; as a result, the molding is separated into the component formed of the metal part 4, the resin part 5, and the oil sump forming member 9, and the master shaft 7. The amount by which the metal part 4 diverges can be controlled by varying, for example, the thickness of the metal part 4, the composition of the electrolyte solution, and the electroforming conditions.

In a case in which the inner periphery of the metal part 4 cannot be diverged to a sufficient degree solely by imparting an impact, it is possible to separate the metal part 4 from the master shaft 7 by generating a difference in thermal expansion amount therebetween by heating or cooling the metal part 4 and the master shaft 7.

The oil sump forming member 9 is detached from the thus separated component formed of the metal part 4, the resin part 5, and the oil sump forming member 9, whereby there is formed the bearing 3 having the oil sump 6.

To retain a sufficient amount of oil, the ratio of the volume of the oil sump 6, that is, the volume V1 of the oil sump forming member 9, to the volume V2 of the bearing gap, is preferably set to 10 or more (V1/V2>10). While in this embodiment the oil sump forming member 9 is formed of an elastic material such as rubber, it is also possible, for example, to form the oil sump forming member 9 of a dissoluble material, forming the oil sump through dissolution in solvent after the separating step. Alternatively, it is also possible to form the inner peripheral surface 3a of the bearing 3 in a cylindrical configuration, and to remove a part of the cylindrical inner peripheral surface 3a by machining such as turning, thereby forming the oil sump 6. Further, while in this embodiment the oil sump 6 is formed in the bearing 3, it is also possible to form the oil sump 6 in the shaft member 2 by removing a part of the outer peripheral surface 2a of the shaft member 2 by machining such as turning.

After that, the separately produced shaft member 2 is inserted into the bearing 3, and the bearing gap between the inner peripheral surface of the bearing 3 and the outer peripheral surface of the shaft member 2 and the oil sump 6 is filled with lubricating oil, whereby the bearing device 1 as shown in FIG. 1 is completed.

As shown in FIG. 1, in this embodiment, the inner peripheral surface 3a of the bearing 3 is formed by the inner peripheral surface 4a of the metal part 4 and a small diameter inner peripheral surface 5a of the resin part 5, and the inner peripheral surface 4a of the metal part 4 functions as the bearing surface. The composition of the resin material and the molding conditions are determined such that the small diameter inner peripheral surface 5a of the resin part 5 diverges through molding shrinkage at the time of curing after the injection molding, whereby it is possible to form a minute gap between this inner peripheral surface and the outer peripheral surface of the master shaft 7. As a result, it is possible to easily separate the resin part 5 and the master shaft 7 from each other. In the bearing device 1 shown in FIG. 1, when the width of the minute gap is of an appropriate size, the minute gap between the small diameter inner peripheral surface 5a of the resin part 5 and the outer peripheral surface 2a of the shaft member 2 can function as a capillary seal, which is effective in preventing lubricant oil from flowing out of the bearing gap. Alternatively, it is also possible to form the small diameter inner peripheral surface 5a by machining or the like after the separation of the master shaft 7.

In this way, apart from diverging the small diameter inner peripheral surface 5a of the resin part 5, the capillary seal can be formed by forming a small diameter outer peripheral surface (not shown) on the outer peripheral surface 2a of the shaft member 2 opposed to the small diameter inner peripheral surface 5a. Further, when the capillary seal is formed as a tapered seal gradually reduced in diameter toward the bearing gap, it is possible to more effectively prevent the lubricant oil from flowing out.

The separated master shaft 7 may be used as it is as the shaft member 2. In this case, the minute gap between the inner peripheral surface 4a of the metal part 4 and the outer peripheral surface of the master shaft 7 formed in the step of separating the metal part 4 from the master shaft 7 functions as a bearing gap. Due to the characteristics of electroforming, this bearing gap is of a very small clearance and high precision, so it helps to provide a bearing of high rotational accuracy or slidability. As described above, in the case of forming a bearing through replacement with a shaft member produced separately, once produced, the master shaft 7 can be repeatedly used, so it is possible to restrain an increase in the production cost for the master shaft 7, making it possible to produce the bearing device 1 at a still lower cost.

During operation (rotation, sliding, rotary sliding, or rocking) of the bearing device 1, oil supplied from the oil sump 6 forms an oil film in the bearing gap between the inner peripheral surface 4a of the metal part 4 and the outer peripheral surface 2a of the shaft member 2, so lubricant oil always exists abundantly in the bearing gap. As a result, it is possible to avoid noise generation due to defective lubrication caused by shortage of oil and wear due to the contact sliding between the shaft member 2 and the bearing 3, thereby making it possible to attain a longer product life.

The first embodiment of the present invention is not restricted to the form described above. In a bearing device 21 shown in FIG. 5, the metal part 4 is formed on the inner peripheral surface and the inner bottom surface of a bearing 3 formed in a cup-like configuration. A shaft member 2 whose lower end has a convex spherical configuration is inserted into the inner periphery of the bearing 3. A thrust bearing portion T supporting the shaft member 2 in the thrust direction is formed between the forward end of a convex spherical portion 2b of the shaft member 2 and an inner bottom surface 4c of the metal part 4. In this case, the oil sump 6 serving as the oil feeding mechanism is formed between the convex spherical portion 2b of the shaft member 2 and the inner peripheral surface 4a and the inner bottom surface 4c of the metal part 4.

Figure 6:
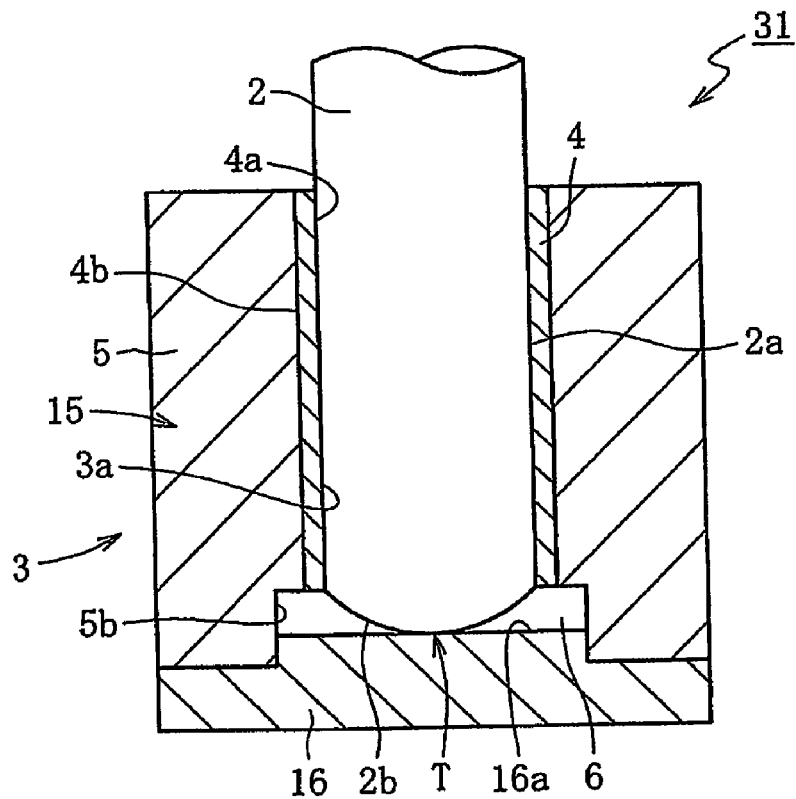
FIG. 6 is a sectional view of a bearing device 31.

In a bearing device 31 shown in FIG. 6, a side portion 15 and a bottom portion 16 of a cup-shaped bearing 3 are formed as separate members. The bottom portion 16 is formed, for example, of a metal material, and is fixed to the side portion 15 by bonding, high-frequency fusion-bonding, ultrasonic welding, or the like. The thrust bearing portion T for supporting the shaft member 2 in the thrust direction is formed between the forward end of the convex spherical portion 2b of the shaft member 2 and an upper end surface 16a of the bottom portion 16 of the bearing 3. In this case, the space surrounded by the convex spherical portion 2b of the shaft member 2, a step portion 5b of the resin part 5, the lower end portion of the metal part 4, and an upper end surface 16a of the bottom portion 16 functions as the oil sump 6 serving as the oil feeding mechanism. In this case, it is possible to form the step portion 5b of the resin part 5 through adjustment of the mold at the time of injection molding, so the formation of the oil sump 6 is facilitated.

Next, a second embodiment of the present invention will be described with reference to FIGS. 7 through 13.

Figure 7:
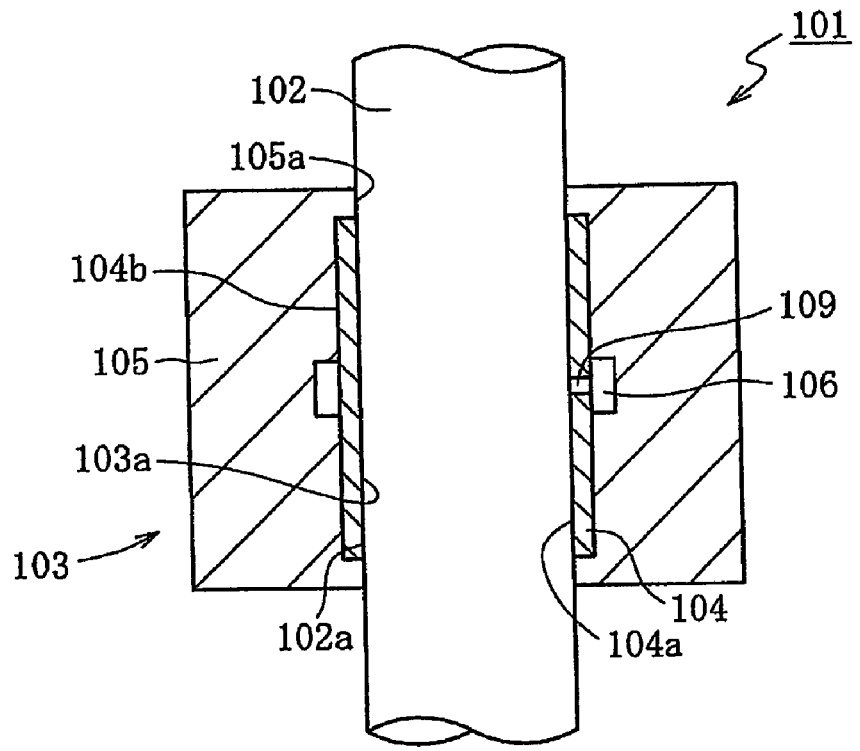
FIG. 7 is a sectional view of an electrocast shaft 111 according to a second embodiment of the present invention.

FIG. 7 is a sectional view of a bearing device 101 according to the second embodiment of the present invention. The bearing device 101 includes a bearing 103 and a shaft member 102 inserted into the inner periphery of the bearing 103. Of these, the bearing 103 is equipped with a metal part 104 formed by electroforming, and a resin part 105 holding the metal part 104 in the inner periphery thereof. As shown in FIG. 7, in this embodiment, an oil sump 106 is provided as an oil feeding mechanism, and the oil sump 106 is adjacent to an outer peripheral surface 104b of the metal part 104, and is spaced apart from an outer peripheral surface 102a of the shaft member 102.

An inner peripheral surface 104a of the metal part 104 functions as the bearing surface. The bearing 103 has the oil sump 106 spaced apart from the outer peripheral surface 102a of the shaft member 102, and communication is established between the oil sump 106 and the bearing gap between the inner peripheral surface 104a of the metal part 104 and the outer peripheral surface 102a of the shaft member 102 through a communication hole 109 extending through the metal part 104. The resin part 105 is substantially of a cylindrical configuration, and can be formed by resin molding.

In the following, a process for producing the bearing 103 will be described. The bearing 103 is produced by the step of performing a predetermined processing such as masking on a portion of a master shaft 107 where it is required (see FIG. 8), the step of forming an electrocast shaft 111 by performing electroforming or the like on the non-masked portion (see FIGS. 9 and 10), the step of performing resin injection molding on the metal part 104 of the electrocast shaft 111 (see FIG. 11), and the step of separating the metal part 104 from the master shaft 107 to separate the bearing 103 and the master shaft 107 from each other.

The master shaft 107 is formed of a conductive material such as stainless steel that has undergone quenching, and is formed as a straight shaft with a circular cross-sectional configuration. Of course, the material is not restricted to stainless steel; there is selected a material satisfying the requisite properties in terms of the function of the bearing and of the convenience in the production of the bearing, such as mechanical strength like rigidity, slidability, heat resistance, chemical resistance, and workability and releasability of the metal part 104; further, a heat treatment method is selected. A non-metal material such as ceramic can also be used by performing conduction treatment thereon (e.g., by forming a conductive metal film thereon). It is desirable to perform on the surface of the master shaft 107 surface treatment for reducing the frictional force between itself and the metal part 104, for example, resin coating with a fluorine-based resin.

The master shaft 107 may be a solid shaft, a hollow shaft, or a solid shaft with a hollow portion filled with resin. In the case of a rotary bearing, the master shaft is basically formed in a circular cross-sectional configuration, whereas, in the case of a sliding bearing, the bearing may be formed in an arbitrary cross-sectional configuration; apart from a circular one, it may have a polygonal or a non-round sectional configuration. While in the case of a sliding bearing, the cross-sectional configuration of the master shaft 107 is basically the same in the axial direction, in the case of a rotary bearing and a rotary sliding bearing, the cross-sectional configuration thereof may not be fixed over the entire length of the shaft.

The surface precision of the outer peripheral surface of the master shaft 107 directly influences the precision of the bearing gap described below, so it is necessary to previously finish with high accuracy the surface precision that is important in terms of bearing function, such as roundness, cylindricality, and surface roughness. For example, in the case of a rotary bearing, roundness is regarded as important from the viewpoint of avoiding contact with the bearing surface, so it is necessary to enhance as much as possible the roundness of the outer peripheral surface of the master shaft 107. For example, it is desirable to effect finishing to a level of not more than 80% of the average width (radial dimension) of the bearing gap described below. Thus, when, for example, setting the average width of the bearing gap to 2 μm, it is desirable for the outer peripheral surface of the master shaft to be finished to a roundness of 1.6 μm or less.

Figure 8:
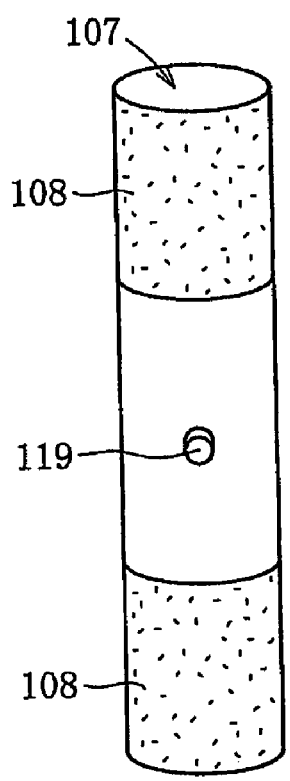
FIG. 8 is a perspective view of a master shaft 107 with masking effected on the outer peripheral surface thereof.

Masking is effected on the outer peripheral surface of the master shaft 107 except for the portion where the metal part 104 is to be formed (as indicated by the dotted pattern in FIG. 8). As a covering material 108 for the masking, there is selected and used an existing product having non-conductivity and corrosion resistance with respect to electrolyte solution. Further, a protrusion 119 is provided in the portion where the communication hole 109 is to be formed. For the protrusion 119, there is used a material which exhibits non-conductivity and corrosion resistance with respect to electrolyte solution and which can be melted by a specific solvent, such as a dissoluble resin. The radial dimension (protrusion height) of the protrusion 119 is set to be approximately the same as the thickness of the metal part 104 formed afterwards. While in this embodiment the protrusion 119 is provided substantially at the center in the axial direction, there are no particular limitations regarding the position and number thereof; they are to be determined according to the position where an oil sump forming member 110 described below is arranged.

To perform electroforming, the master shaft 107 is immersed in an electrolyte solution containing ions of metals such as Ni and Cu, and electricity is supplied to the electrolyte solution to cause the target metal to be deposited on the surface of the master shaft 107. The electrolyte solution may contain as needed a sliding material such as carbon or stress mitigating material such as saccharin. The electro-deposited metal is selected as appropriate according to the physical and chemical properties required of the bearing surface of the bearing, such as hardness, wear resistance, and fatigue strength. If the thickness of the metal part 104 is too large, its separability from the master shaft 107 deteriorates, whereas, if it is too small, that will lead to a reduction in the durability of the bearing surface, etc.; thus, the metal part is set to an optimum thickness according to the requisite bearing performance, bearing size, use, etc. For example, in the case of a rotary bearing of a shaft diameter of 1 mm to 6 mm, it is desirable for the thickness to range from 10 μm to 200 μm.

Figure 9:
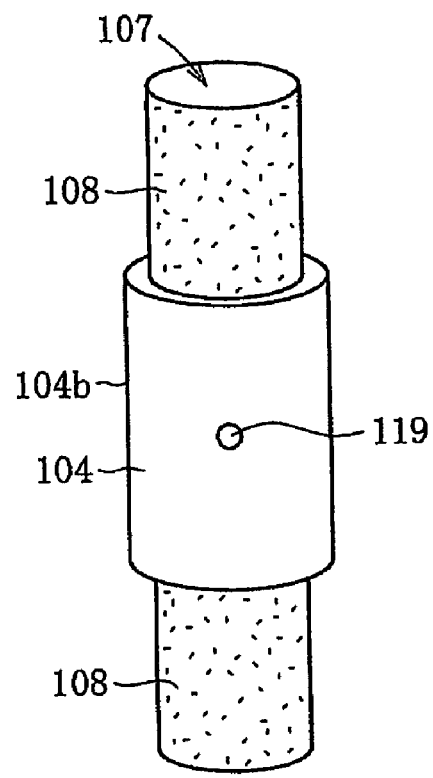
FIG. 9 is a perspective view of the master shaft 107 with a metal part 104 formed thereon.

Through the above-mentioned steps, the cylindrical metal part 104 is formed in the outer periphery of the master shaft 107 as shown in FIG. 9, with the outer end surface of the protrusion 119 being exposed on the outer peripheral surface 104b of the metal part 104. When the covering material 108 for the masking is thin, both ends of the metal part 104 may protrude toward the covering material 108 to form tapered beveled portions in the inner peripheral surface thereof. By utilizing the beveled portions, it is possible to form flange portions for preventing detachment of the metal part from the resin part. In the case of this embodiment, no such beveled portions are formed. Further, while in this embodiment the metal part 104 is formed so as to be axially continuous, it is also possible to form the metal part 104 at a plurality of positions axially spaced apart from each other.

Figure 10:
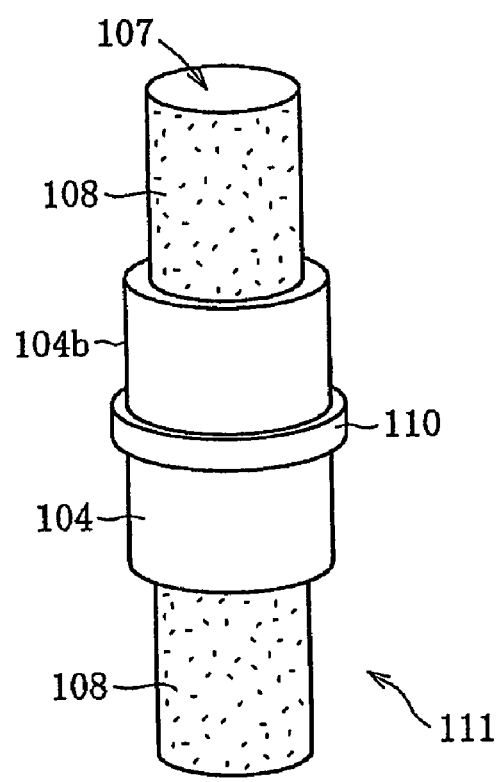
FIG. 10 is a perspective view of the electrocast shaft 111.

After that, as shown in FIG. 10, an oil sump forming member 110 is arranged so as to cover the protrusion 119 on the outer peripheral surface 104*b* of the metal part 104. In arranging the member, it is possible, for example, to adopt a method in which the master shaft 107, the metal part 104, and the protrusion 119 are installed in a mold to integrally form the oil sump forming member 110 through injection molding of resin or the like, or a method in which the oil sump forming member 110 separately formed is fit-engaged with the outer peripheral surface 104*b* of the metal part 104. The oil sump forming member 110 is formed of a material which is dissoluble in solvent and whose melting point is higher than that of the injected resin so that it may not be melted by the high temperature resin material injected at the time of injection molding. If the material selected for the oil sump forming member 110 is one which is the same as that of the protrusion 119 or one which is dissoluble in the same solvent as the protrusion 119, the melting of the oil sump 110 and the protrusion 119 after the injection molding described below can be performed at the same time, thereby simplifying the process. In the manner as described above, there is formed on the outer peripheral surface of the master shaft 107 an electrocast shaft 111 having the metal part 104 and the oil sump forming member 110.

Figure 11:
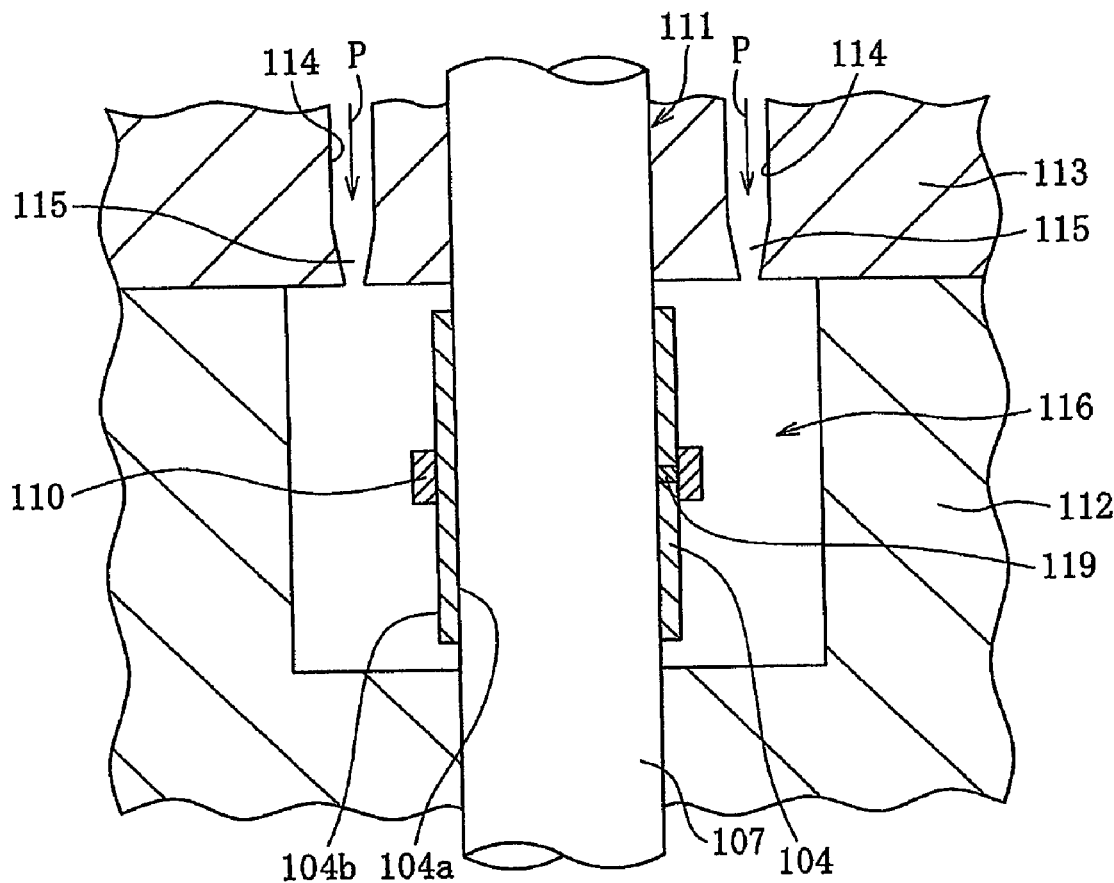
FIG. 11 is a sectional view of the electrocast shaft 111 as set in a mold for injection molding.
Figure 12:
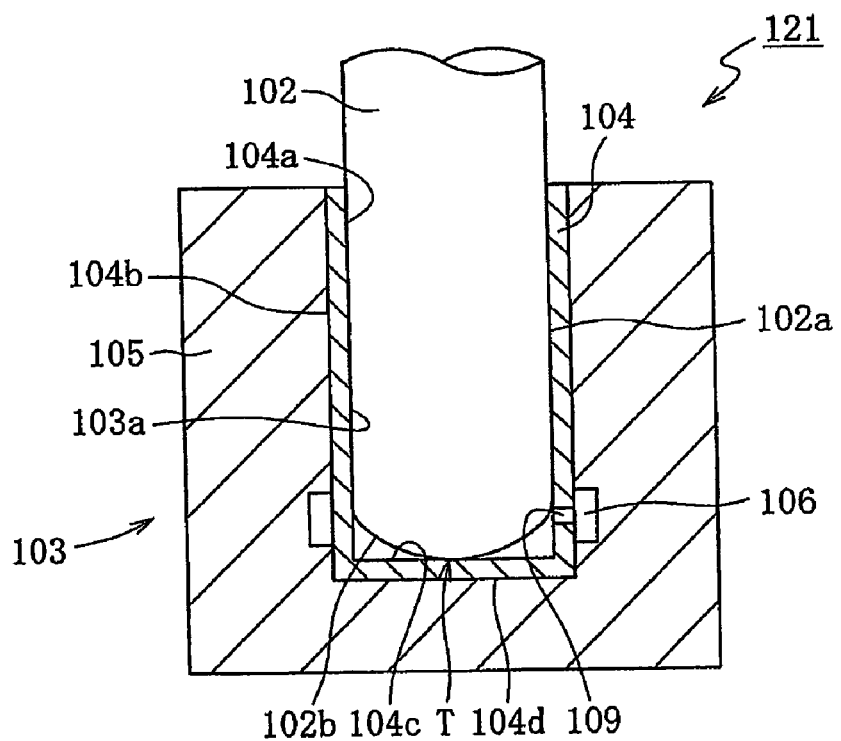
FIG. 12 is a sectional view of a bearing device 121.

There are no particular limitations regarding the position where the oil sump forming member 110 is formed as long as it can be brought into contact with the outer end surface of the protrusion 119. While in this embodiment shown in FIG. 10 the oil sump forming member 110 is formed over the entire periphery (in an annular configuration), it is also possible, for example, to provide a plurality of arcuate oil sump forming members 110 at positions circumferentially spaced apart from each other. Regarding the sectional configuration of the oil sump forming member 110, it may be, apart from the rectangular one as shown in FIG. 11, an arbitrary configuration such as a semi-circular one or a trapezoidal one. Further, while in FIG. 10 the oil sump forming member 110 is arranged at a single position at the axial center of the outer side of the metal part 104, it is also possible for the member to be axially shifted in any direction or for a plurality of oil sump forming members to be arranged in the axial direction.

The electrocast shaft 111 is transferred to the injection molding step as illustrated in FIG. 11, where insert molding is effected using the metal part 104, the oil sump forming member 110, the master shaft 107, and the protrusion 119 as the insert components.

FIG. 11 conceptually illustrates the step of forming the resin part 105 by insert molding; a mold including a movable mold portion 112 and a stationary mold portion 113 is provided with runners 114, gates 115, and a cavity 116. In this embodiment, the gates 115 are dot-like gates, which are formed in the mold (stationary mold portion 113) at a plurality of (e.g., three) positions at equal circumferential intervals so as to be in correspondence with one axial end surface of the resin part 105. The gate area of the gates 115 is set to an appropriate value in conformity with the viscosity of the molten resin with which the mold is to be filled, and the configuration of the molding.

In the mold constructed as described above, the movable mold portion 112 is brought close to the stationary mold portion 113 to effect clamping, with the electrocast shaft 111 being set at a predetermined position. Next, in the clamped state, molten resin P is injected through a sprue (not shown), the runners 114, and the gates 115 to fill the cavity 116 with the molten resin P, thereby forming the resin part 105 integrally with the electrocast shaft 111.

Note that the molten resin P is made of a thermoplastic resin, for example, it is possible to use: an amorphous resin such as polysulfone (PSF), polyether sulfone (PES), polyphenyl sulfone (PPSU), or polyether imide (PEI); or a crystalline resin such as liquid crystal polymer (LCP), polyetherether ketone (PEEK), polybutyrene terephthalate (PBT), or polyphenylene sulfide (PPS). Further, there are no particular limitations regarding the filler to be used for the above resin. For example, as the filler, it is possible to use: a fibrous filler such as glass fiber; a whisker-like filler such as potassium titanate; a scale-like filler such as mica; or a fibrous or powdered conductive filler such as carbon fiber, carbon black, graphite, carbon nanomaterial, and metal powder. Those fillers may be used singly or in the form of a mixture of two or more of them.

After the opening of the mold, the molding, in which the master shaft 107, the metal part 104, the oil sump forming member 110, the protrusion 119, and the resin part 105 are integrated with each other, is released from the mold. In the subsequent separating step, this molding is separated into a component formed of the metal part 104, the resin part 105, the oil sump forming member 110, and the protrusion 119, and the master shaft 107.

In the separating step, the inner stress accumulated in the metal part 104 is released, whereby the inner peripheral surface 104*a* of the metal part 104 is diverged to thereby separate the metal part 104 from the outer peripheral surface of the master shaft 107. The releasing of the inner stress is effected by imparting an impact to the master shaft 107 or the bearing 103, or by imparting an axial pressurizing force between the inner peripheral surface 104*a* of the metal part 104 and the outer peripheral surface of the master shaft 107. By releasing the inner stress, the inner peripheral surface of the metal part 104 is radially diverged to thereby form a gap of an appropriate size between the inner peripheral surface 104*a* of the metal part 104 and the outer peripheral surface of the master shaft 107, whereby the master shaft 107 can be smoothly released in the axial direction from the inner peripheral surface 104*a* of the metal part 104; as a result, the molding is separated into the component formed of the metal part 104, the resin part 105, the oil sump forming member 110, and the protrusion 119, and the master shaft 107. The amount by which the metal part 104 diverges can be controlled by varying, for example, the thickness of the metal part 104, the composition of the electrolyte solution, and the electroforming conditions.

In a case in which the inner periphery of the metal part 104 cannot be diverged to a sufficient degree solely by imparting an impact, it is possible to separate the metal part 104 from the master shaft 107 by generating a difference in thermal expansion amount therebetween by heating or cooling the metal part 104 and the master shaft 107.

Of the thus separated component formed of the metal part 104, the resin part 105, the oil sump forming portion 110, and the protrusion 119, the protrusion 119 and the oil sump forming member 110 are melted by solvent to form the bearing 103 having the communication hole 109 and the oil sump 106. To retain a sufficient amount of oil, the ratio of the volume of the oil sump 106, that is, the volume V1 of the oil sump forming member 110, to the volume V2 of the bearing gap, is desirably set to 10 or more (V1/V2>10).

After that, the separately produced shaft member 102 is inserted into the bearing 103, and the bearing gap between the inner peripheral surface of the bearing 103 and the outer peripheral surface of the shaft member 102 and the oil sump 106 are filled with lubricating oil, whereby the bearing device 101 shown in FIG. 7 is completed.

While in this embodiment the communication hole 109 and the oil sump 106 are formed by the separate members of the protrusion 119 and the oil sump forming member 110, it is also possible, for example, to arrange, on the outer peripheral surface of the master shaft 107 prior to the electroforming, a member in which the protrusion 119 and the oil sump forming member 110 are integrated with each other, and perform, thereafter, electroforming, injection molding, separation, and melting in the same manner as described above, thereby forming the communication hole 109 and the oil sump 106 in the bearing 103. In this case, while the oil sump 106 may be provided so as to be in contact with the outer peripheral surface 104b of the metal part 104 as shown in FIG. 7, it is also possible for the oil sump and the metal part 104 to be provided so as to be radially spaced apart from each other. In this case, the communication hole 109 extends through the metal part 104 and the resin part 105 to establish communication (not shown) between the oil sump 106 and the bearing gap.

Further, as shown in FIG. 7, in this embodiment, the inner peripheral surface 103a of the bearing 103 is formed by the inner peripheral surface 104a of the metal part 104 and a small diameter inner peripheral surface 105a of the resin part 105, and the inner peripheral surface 104a of the metal part 104 functions as the bearing surface. The composition of the resin material and the molding conditions are determined such that the small diameter inner peripheral surface 105a of the resin part 105 diverges through molding shrinkage at the time of curing after the injection molding, whereby it is possible to form a minute gap between this inner peripheral surface and the outer peripheral surface of the master shaft 107. As a result, it is possible to easily separate the resin part 105 and the master shaft 107 from each other. In the bearing device 101 shown in FIG. 7, when the width of the minute gap is of an appropriate size, the minute gap between the small diameter inner peripheral surface 105a of the resin part 105 and the outer peripheral surface 102a of the shaft member 102 can function as a capillary seal, which is effective in preventing lubricant oil from flowing out of the bearing gap. Alternatively, it is also possible to form the small diameter inner peripheral surface 105a by machining or the like after the separation of the master shaft 107.

In this way, apart from diverging the small diameter inner peripheral surface 105a of the resin part 105, the capillary seal can be formed by forming a small diameter outer peripheral surface (not shown) on the outer peripheral surface 102a of the shaft member 102 opposed to the small diameter inner peripheral surface 105a. Further, when the capillary seal is formed as a tapered seal gradually reduced in diameter toward the bearing gap, it is possible to more effectively prevent the lubricant oil from flowing out.

In the case in which the master shaft 107 is used as the shaft member 102, the minute gap between the inner peripheral surface 104a of the metal part 104 and the outer peripheral surface of the master shaft 107 formed in the step of separating the metal part 104 from the master shaft 107 functions as a bearing gap. Due to the characteristics of electroforming, this bearing gap is of a very small clearance and high precision, so it helps to provide a bearing of high rotational accuracy or slidability. It is not always necessary to use the master shaft 107 as the shaft member 102, and it is also possible to form a bearing through replacement with a shaft member produced separately with substantially the same precision as the master shaft 107. In this case, once produced, the master shaft 107 can be repeatedly used, so it is possible to restrain an increase in the production cost for the master shaft 107, making it possible to produce the bearing device 101 at a still lower cost.

During operation (rotation, sliding, rotary sliding, or rocking) of the bearing device 101, oil supplied from the oil sump 106 forms an oil film in the bearing gap between the inner peripheral surface 104a of the metal part 104 and the outer peripheral surface 102a of the shaft member 102, so lubricant oil always exists abundantly in the bearing gap. As a result, it is possible to avoid noise generation due to defective lubrication caused by shortage of oil and wear due to the contact sliding between the shaft member 102 and the bearing 103, thereby making it possible to attain a longer product life. Further, since the oil retained in the oil sump 106 is supplied to the bearing gap through the communication hole 109, the reduction in the area of the inner peripheral surface 104a of the metal part 104 constituting the bearing surface is very small (i.e., it solely corresponds to the communication hole 109). Thus, it is possible to avoid deterioration in the bearing performance due to a reduction in the bearing surface area.

The second embodiment of the present invention is not restricted to the above-mentioned form. In a bearing device 121 shown in FIG. 12, the metal part 104 is formed on the inner peripheral surface and the inner bottom surface of the bearing 103 formed in a cup-like configuration. The shaft member 102 is inserted into the inner periphery of the bearing 103, and a radial bearing gap is formed between the inner peripheral surface 104a of the metal part 104 and the outer peripheral surface 102a of the shaft member 102; between the inner bottom surface 104c of the metal part 104 and the forward end of the convex spherical portion 102b of the shaft member 102, there is formed the thrust bearing portion T supporting the shaft member 102 in the thrust direction while in contact therewith. In this case, oil retained in the oil sump 106 formed near the lower end of the outer peripheral surface 104b of the metal part 104 is supplied to the radial bearing gap and the thrust bearing portion T through the communication hole 109. As in the case of the bearing device 101 described above, there are no particular limitations regarding the position of the oil sump 106 as long it is out of contact with the shaft member; for example, it may be provided at a position where it is in contact with the lower end surface 104d at the bottom of the metal part 104. Alternatively, it may be arranged inside the resin part 105 so as to be out of contact with the metal part 104.

Figure 13:
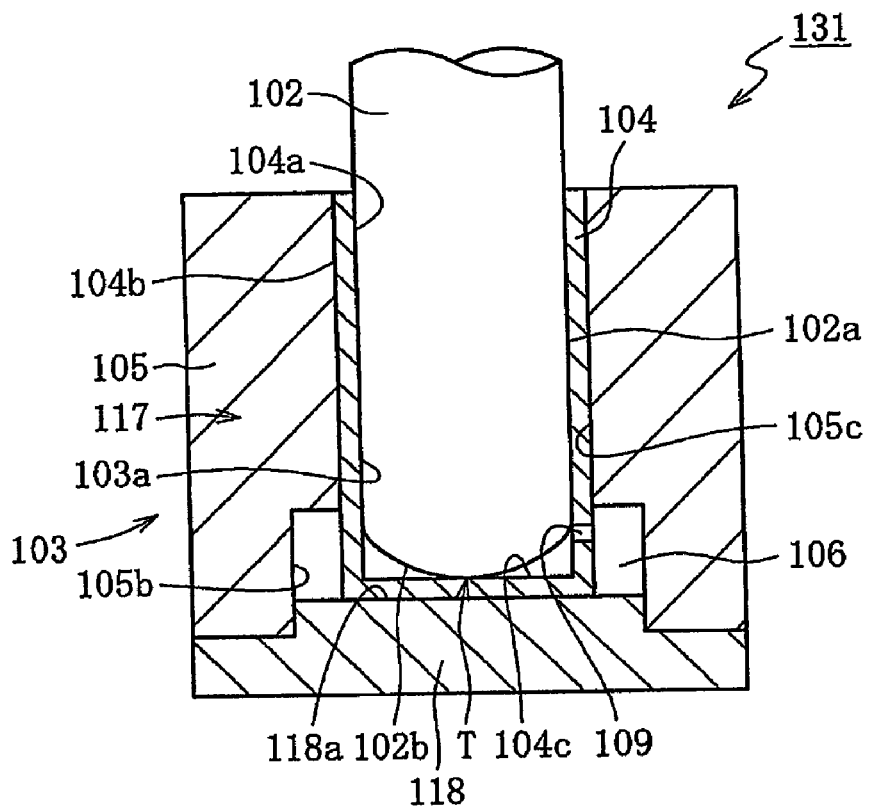
FIG. 13 is a sectional view of a bearing device 131.

In a bearing device 131 shown in FIG. 13, a side portion 117 and a bottom portion 118 of the cup-shaped bearing 103 are formed as separate members. The side portion 117 has a large diameter inner peripheral surface 105b and a small diameter inner peripheral surface 105c, and is formed by resin injection molding. The bottom portion 118 is formed, for example, of a metal material, and is fixed to the side portion 117 by bonding, high-frequency fusion-bonding, ultrasonic welding, or the like. Between the forward end of the convex spherical portion 102b of the shaft member 102 and the inner bottom surface 104c of the metal part 104, there is formed the thrust bearing portion T supporting the shaft member 102 in the thrust direction while in contact therewith. In this case, the oil sump 106 is formed by the region surrounded by the outer peripheral surface 104b of the metal part 104, the upper end surface 118a of the bottom portion 118, and the large diameter inner peripheral surface 105b of the resin part 105, and oil retained in the oil sump 106 is supplied to the bearing gap through the communication hole 109 and the space surrounded by the convex spherical portion 102b of the shaft member 102 and the metal part 104.

In the bearing device 131, the bottom portion 118 of the bearing 103 is formed as a separate member, so it is possible to attain an increase in degree of freedom in the method of forming the large diameter inner peripheral surface 105b of the resin part 105 forming the oil sump 106. For example, by arranging an annular rubber member in the outer periphery of the metal part 104 prior to the injection molding process and removing it after the molding, it is possible to form the large diameter inner peripheral surface 105b of the resin part 105. It is also possible to form the large diameter inner peripheral surface 105b by the mold for the injection molding. Alternatively, the large diameter inner peripheral surface 105b can be formed by removing a part of the resin part 105 by machining such as turning after the resin injection molding. In the case in which the oil sump 106 is formed by these methods, it is necessary for the oil sump 106 to be in contact with the upper end surface 118a of the bottom portion 118; however, when it is formed of a substance dissoluble in solvent as in the case of the above-mentioned bearing devices 101 and 121, there are no particular limitations in this regard.

Next, a third embodiment of the present invention will be described with reference to FIGS. 14 through 19.

Figure 14:
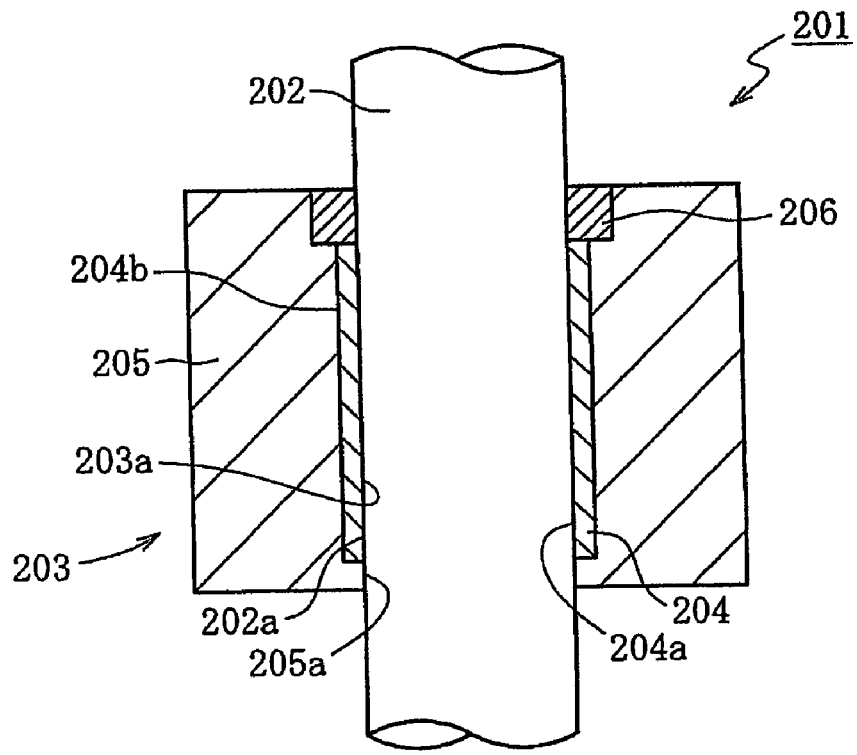
FIG. 14 is a sectional view of a bearing device 201 according to a third embodiment of the present invention.

FIG. 14 is a sectional view of a bearing device 201 according to the third embodiment of the present invention. The bearing device 201 includes a bearing 203 and a shaft member 202 inserted into the inner periphery of the bearing 203. The bearing 203 is equipped with a metal part 204 formed by electroforming, and a resin part 205 holding the metal part 204 in the inner periphery thereof. In this embodiment, an oil feeding member 206 is provided as an oil feeding mechanism.

In the following, a process for producing the bearing 203 will be described. The bearing 203 is produced by, in addition to the step of performing masking on a portion of a master shaft 207 where it is required, the step of forming an electrocast shaft 209 by performing electroforming or the like on the non-masked portion (see FIGS. 15 and 16), the step of performing resin injection molding on the metal part 204 of the electrocast shaft 209 (see FIG. 17), and the step of separating the metal part 204 from the master shaft 207 to separate the bearing 203 and the master shaft 207 from each other.

The master shaft 207 is formed of a conductive material such as stainless steel that has undergone quenching, and is formed as a straight shaft with a circular cross-sectional configuration. Of course, the material is not restricted to stainless steel; there is selected a material satisfying the requisite properties in terms of the function of the bearing and of the convenience in the production of the bearing, such as mechanical strength like rigidity, slidability, heat resistance, chemical resistance, and workability and releasability of the metal part 204; further, a heat treatment method is selected. A non-metal material such as ceramic can also be used by performing conduction treatment thereon (e.g., by forming a conductive metal film thereon). It is desirable to perform on the surface of the master shaft 207 surface treatment for reducing the frictional force between itself and the metal part 204, for example, resin coating with a fluorine-based resin.

The master shaft 207 may be a solid shaft, a hollow shaft, or a solid shaft with a hollow portion filled with resin. In the case of a rotary bearing, the master shaft is basically formed in a circular cross-sectional configuration, whereas, in the case of a sliding bearing, the bearing may be formed in an arbitrary cross-sectional configuration; apart from a circular one, it may have a polygonal or a non-round sectional configuration. While in the case of a sliding bearing, the cross-sectional configuration of the master shaft 207 is basically the same in the axial direction, in the case of a rotary bearing and a rotary sliding bearing, the cross-sectional configuration thereof may not be fixed over the entire length of the shaft.

The surface precision of the outer peripheral surface of the master shaft 207 directly influences the precision of the bearing gap described below, so it is necessary to previously finish with high accuracy the surface precision that is important in terms of bearing function, such as roundness, cylindricality, and surface roughness. For example, in the case of a rotary bearing, roundness is regarded as important from the viewpoint of avoiding contact with the bearing surface, so it is necessary to enhance as much as possible the roundness of the outer peripheral surface of the master shaft 207. For example, it is desirable to effect finishing to a level of not more than 80% of the average width (radial dimension) of the bearing gap described below. Thus, when, for example, setting the average width of the bearing gap to 2 μm, it is desirable for the outer peripheral surface of the master shaft to be finished to a roundness of 1.6 μm or less.

Figure 15:
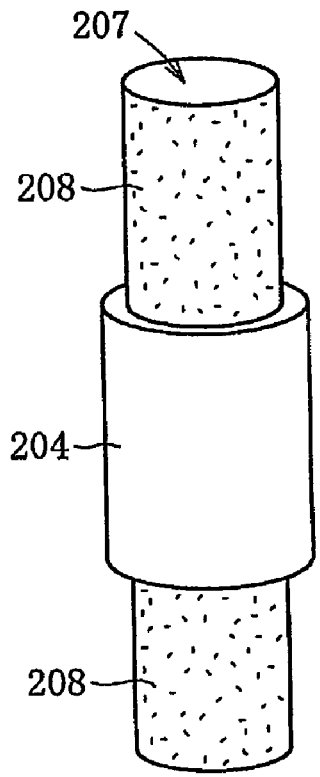
FIG. 15 is a perspective view of a master shaft 207 with a metal part 204 formed thereon.

Masking is effected on the outer peripheral surface of the master shaft 207 except for the portion where the metal part 204 is to be formed (as indicated by the dotted pattern in FIG. 15). As a covering material 208 for the masking, there is selected and used an existing product having non-conductivity and corrosion resistance with respect to electrolyte solution.

To perform electroforming, the master shaft 207 is immersed in an electrolyte solution containing ions of metals such as Ni and Cu, and electricity is supplied to the electrolyte solution to cause the target metal to be deposited on the surface of the master shaft 207. The electrolyte solution may contain as needed a sliding material such as carbon or stress mitigating material such as saccharin. The electro-deposited metal is selected as appropriate according to the physical and chemical properties required of the bearing surface of the bearing, such as hardness, wear resistance, and fatigue strength. If the thickness of the metal part 204 is too large, its separability from the master shaft 207 deteriorates, whereas, if it is too small, that will lead to a reduction in the durability of the bearing surface, etc.; thus, the metal part is set to an optimum thickness according to the requisite bearing performance, bearing size, use, etc. For example, in the case of a rotary bearing of a shaft diameter of 1 mm to 6 mm, it is desirable for the thickness to range from 10 μm to 200 μm.

Through the above-mentioned steps, the cylindrical metal part 204 is formed in the outer periphery of the master shaft 207 as shown in FIG. 15. When the covering material 208 for the masking is thin, both ends of the metal part 204 may protrude toward the covering material 208 to form tapered beveled portions in the inner peripheral surface thereof. By utilizing the beveled portions, it is possible to form flange portions for preventing detachment of the metal part from the resin part. In the case of this embodiment, no such beveled portions are formed.

Figure 16:
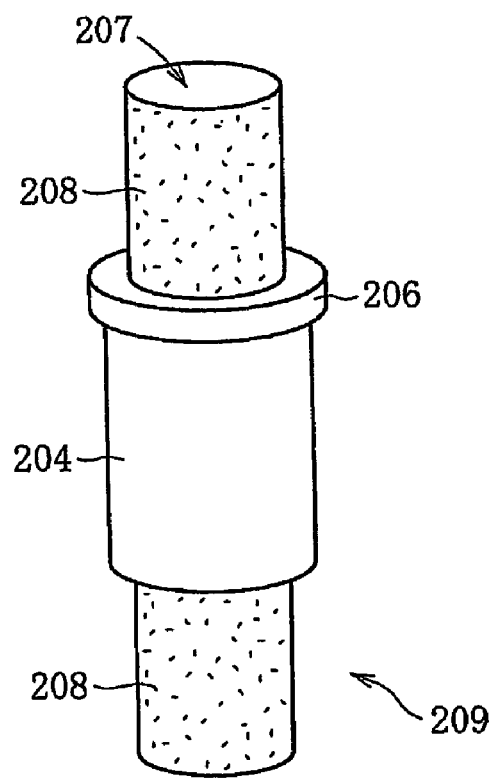
FIG. 16 is a perspective view of an electrocast shaft 209.

After that, as shown in FIG. 16, the oil feeding member 206 is arranged on the outer peripheral surface of the master shaft 207 so as to be axially adjacent to the metal part 204. As the material of the oil feeding member 206, it is possible to use, for example, an oil-containing metal obtained by impregnating a porous metal such as a sintered metal with lubricant oil. Apart from this, it is also possible to use, as the material of the oil feeding member, an oil-containing resin obtained by impregnating a porous resin with lubricant oil, an oil-containing resin in which an oil component is retained in a dispersed state, an oil-containing resin mixed with oil-containing porous particles, or an oil-containing fiber obtained by impregnating a fibrous material such as felt with lubricant oil.

When forming the oil feeding member 206 of resin, it is necessary for the resin to have a melting point higher than that of the resin material to be injected at the time of injection molding so that it may not be melted by the high temperature resin injected. When using, as the material of the oil feeding member 206, a material (porous metal, porous resin, fibrous material or the like) to be impregnated with lubricant oil, the oil feeding member 206 may also be impregnated with lubricant oil simultaneously with the filling of the bearing gap of the bearing device 201 with lubricant oil as described below.

The configuration and arrangement position of the oil feeding member 20 6 and the number of oil feeding members to be arranged are not restricted to the ones mentioned above. While in FIG. 16, showing this embodiment, the oil feeding member 206 is formed over the entire periphery (in an annular configuration), it is also possible, for example, to arrange a plurality of oil feeding members 206 at positions circumferentially spaced apart from each other. Regarding the sectional configuration of the oil feeding member 206, it may be, apart from the rectangular one as shown in FIG. 14, some other appropriate configuration such as a semi-circular or a trapezoidal one. Further, while in FIG. 16 the oil feeding member 206 is arranged at one end of the bearing 203, it may also be arranged at a plurality of positions, for example, at both ends of the bearing 203. Alternatively, it is also possible to form a plurality of metal parts 204 at positions axially spaced apart from each other, arranging the oil feeding member 206 between the metal parts. Further, it is also possible to arrange the oil feeding member 206 and the metal part 204 so as to be axially spaced apart from each other.

In the manner as described above, there is formed the electrocast shaft 209 having on the outer peripheral surface of the master shaft 207 the metal part 204 and the oil feeding member 206. The electrocast shaft 209 is transferred to the injection molding step as illustrated in FIG. 17, where insert molding is effected using the metal part 204, the oil feeding member 206, and the master shaft 207 as the insert components.

Figure 17:
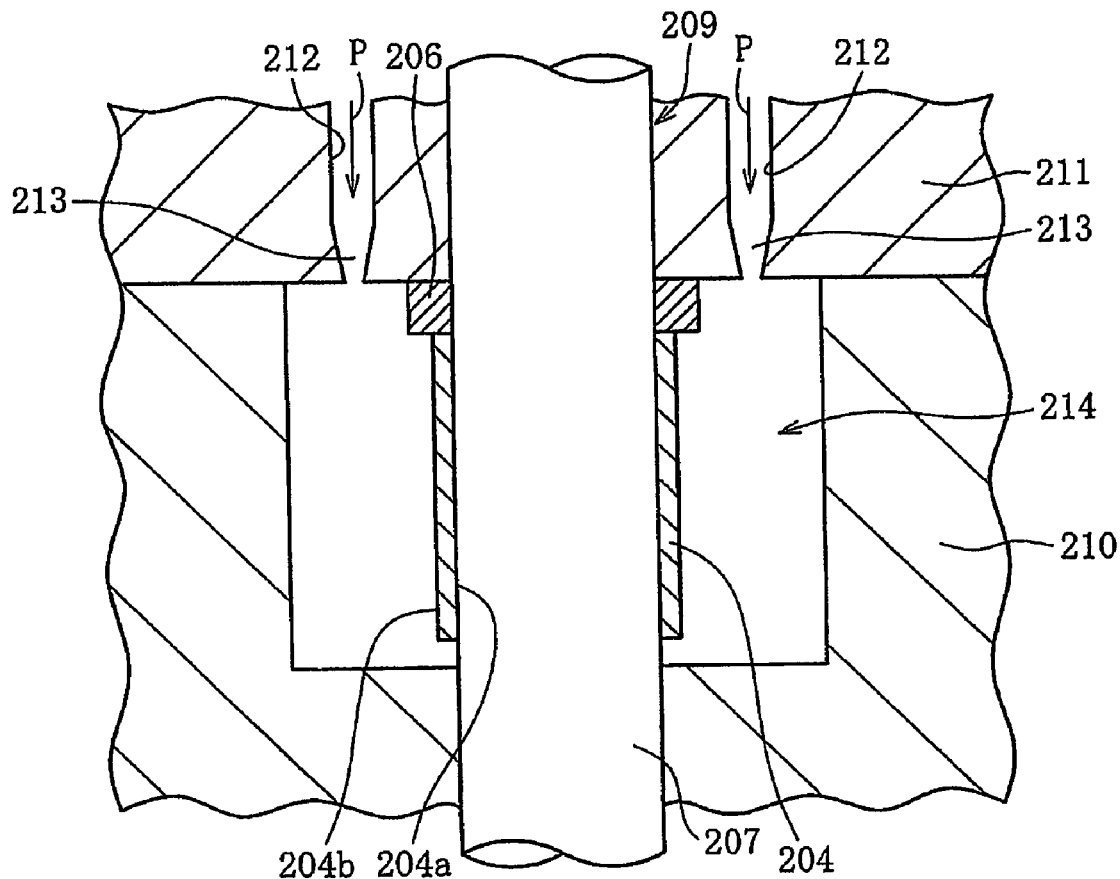
FIG. 17 is a sectional view of the electrocast shaft 209 as set in a mold for injection molding.
Figure 18:
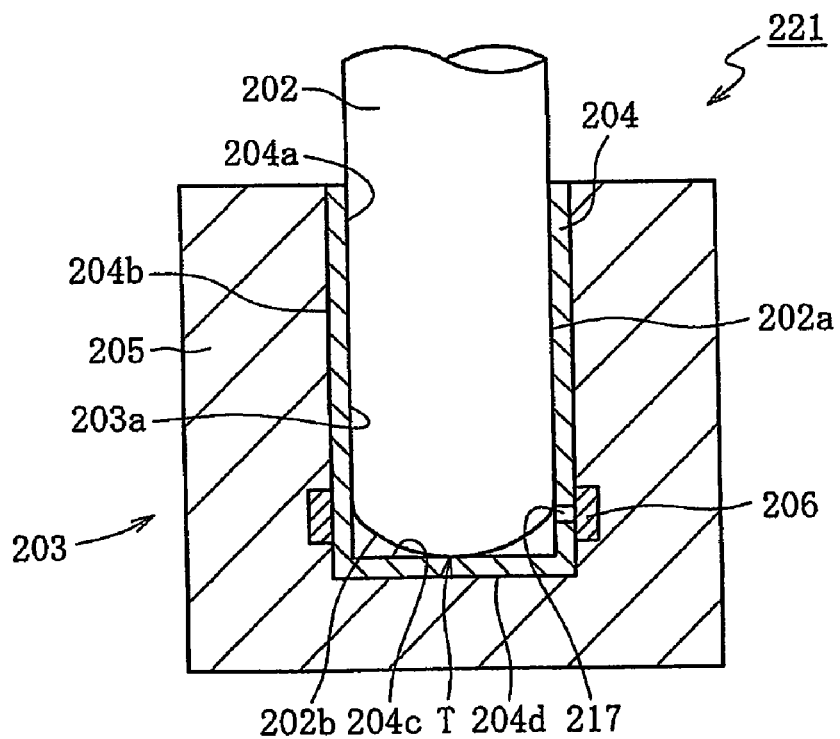
FIG. 18 is a sectional view of a bearing device 221.

FIG. 17 conceptually illustrates the step of forming the resin part 205 by insert molding; a mold including a movable mold portion 210 and a stationary mold portion 211 is provided with runners 212, gates 213, and a cavity 214. In this embodiment, the gates 213 are dot-like gates, which are formed in the mold (stationary mold portion 211) at a plurality of (e.g., three) positions at equal circumferential intervals so as to be in correspondence with one axial end surface of the resin part 205. The gate area of the gates 213 is set to an appropriate value in conformity with the viscosity of the molten resin with which the mold is to be filled, and the configuration of the molding.

In the mold constructed as described above, the movable mold portion 210 is brought close to the stationary mold portion 211 to effect clamping, with the electrocast shaft 209 being set at a predetermined position. Next, in the clamped state, molten resin P is injected through a sprue (not shown), the runners 212, and the gates 213 to fill the cavity 214 with the molten resin P, thereby forming the resin part 205 integrally with the electrocast shaft 209.

Note that the molten resin P is made of a thermoplastic resin, for example, it is possible to use: an amorphous resin such as polysulfone (PSF), polyether sulfone (PES), polyphenyl sulfone (PPSU), or polyether imide (PEI); or a crystalline resin such as liquid crystal polymer (LCP), polyetherether ketone (PEEK), polybutyrene terephthalate (PBT), or polyphenylene sulfide (PPS). Further, there are no particular limitations regarding the filler to be used for the above resin. For example, as the filler, it is possible to use: a fibrous filler such as glass fiber; a whisker-like filler such as potassium titanate; a scale-like filler such as mica; or a fibrous or powdered conductive filler such as carbon fiber, carbon black, graphite, carbon nanomaterial, and metal powder. Those fillers may be used singly or in the form of a mixture of two or more of them.

After the opening of the mold, the molding, in which the master shaft 207, the metal part 204, the oil feeding member 206, and the resin part 205 are integrated with each other, is released from the mold. In the subsequent separating step, this molding is separated into the bearing 203 formed of the metal part 204, the resin part 205, and the oil feeding member 206 (see FIG. 14), and the master shaft 207.

In the separating step, the inner stress accumulated in the metal part 204 is released, whereby the inner peripheral surface 204a of the metal part 204 is diverged to thereby separate the metal part 204 from the outer peripheral surface of the master shaft 207. The releasing of the inner stress is effected by imparting an impact to the master shaft 207 or the bearing 203, or by imparting an axial pressurizing force between the inner peripheral surface 204a of the metal part 204 and the outer peripheral surface of the master shaft 207. By releasing the inner stress, the inner peripheral surface of the metal part 204 is radially diverged to thereby form a gap of an appropriate size between the inner peripheral surface 204a of the metal part 204 and the outer peripheral surface of the master shaft 207, whereby the master shaft 207 can be smoothly released in the axial direction from the inner peripheral surface 204a of the metal part 204; as a result, the molding is separated into the bearing 203 formed of the metal part 204, the resin part 205, and the oil sump forming member 206, and the master shaft 207. The amount by which the metal part 204 diverges can be controlled by varying, for example, the thickness of the metal part 204, the composition of the electrolyte solution, and the electroforming conditions.

In a case in which the inner periphery of the metal part 204 cannot be diverged to a sufficient degree solely by imparting an impact, it is possible to separate the metal part 204 from the master shaft 207 by generating a difference in thermal expansion amount therebetween by heating or cooling the metal part 204 and the master shaft 207.

After that, the separately produced shaft member 202 is inserted into the bearing 203, and the bearing gap between the inner peripheral surface of the bearing 203 and the outer peripheral surface of the shaft member 202 is filled with lubricating oil, whereby the bearing device 20 as shown in FIG. 14 is completed.

As shown in FIG. 14, in this embodiment, the inner peripheral surface 203a of the bearing 203 is formed by the inner peripheral surface 204a of the metal part 204 and a small diameter inner peripheral surface 205a of the resin part 205, and the inner peripheral surface 204a of the metal part 204 functions as the bearing surface. The composition of the resin material and the molding conditions are determined such that the small diameter inner peripheral surface 205a of the resin part 205 diverges through molding shrinkage at the time of curing after the injection molding, whereby it is possible to form a minute gap between this inner peripheral surface and the outer peripheral surface of the master shaft 207. As a result, it is possible to easily separate the resin part 205 and the master shaft 207 from each other. In the bearing device 201 shown in FIG. 14, when the width of the minute gap is of an appropriate size, the minute gap between the small diameter inner peripheral surface 205a of the resin part 205 and the outer peripheral surface 202a of the shaft member 202 can function as a capillary seal, which is effective in preventing lubricant oil from flowing out of the bearing gap. Alternatively, it is also possible to form the small diameter inner peripheral surface 205a by machining or the like after the separation of the master shaft 207.

In this way, apart from diverging the small diameter inner peripheral surface 205a of the resin part 205, the capillary seal can be formed by forming a small diameter outer peripheral surface (not shown) on the outer peripheral surface 202a of the shaft member 202 opposed to the small diameter inner peripheral surface 205a. Further, when the capillary seal is formed as a tapered seal gradually reduced in diameter toward the bearing gap, it is possible to more effectively prevent the lubricant oil from flowing out.

In the case in which the master shaft 207 is used as the shaft member 202, the minute gap between the inner peripheral surface 204a of the metal part 204 and the outer peripheral surface of the master shaft 207 formed in the step of separating the metal part 204 from the master shaft 207 functions as a bearing gap. Due to the characteristics of electroforming, this bearing gap is of a very small clearance and high precision, so it helps to provide a bearing of high rotational accuracy or slidability. It is not always necessary to use the master shaft 207 as the shaft member 202, and it is also possible to form a bearing through replacement with a shaft member produced separately with substantially the same precision as the master shaft 207. In this case, once produced, the master shaft 207 can be repeatedly used, so it is possible to restrain an increase in the production cost for the master shaft 207, making it possible to produce the bearing device 201 at a still lower cost.

While in this embodiment the metal part 204, the resin part 205, and the oil feeding member 206 are formed integrally, the way the oil feeding member 206 is arranged is not restricted to that described above. For example, it is also possible to form a recess in the resin part 205, and to fix the oil feeding member 206 to the recess. The recess of the resin part 205 can be formed, for example, by the configuration of the mold at the time of injection molding, or by removing a part of the resin part 205 by machining such as turning after the injection molding.

During operation (rotation, sliding, rotary sliding, or rocking) of the bearing device 201, the oil supplied from the oil feeding member 206 forms an oil film between the inner peripheral surface 204a of the metal part 204 and the outer peripheral surface 202a of the shaft member 202, whereby it is possible to avoid noise generation due to deflective lubrication caused by shortage of oil and wear due to the contact sliding between the shaft member 202 and the bearing 203, thereby attaining an increase in product life. Further, by causing the oil feeding member to retain oil, it is possible to supply oil in more minute amounts than in the case in which oil is supplied from a space such as an oil sump, so it is possible to maintain an appropriate oil film in the bearing gap for a long period of time.

The third embodiment of the present invention is not restricted to the above-mentioned form. While in the bearing device 201 described above the oil feeding member 206 is in contact with the shaft member 202, it is also possible, for example, to arrange, as in the case of a bearing device 221 shown in FIG. 18, the oil feeding member 206 at a position where it is out of contact with the shaft member 202, supplying oil to the bearing gap through a communication hole 217 extending through the metal part 204. In the bearing device 221, the metal part 204 is formed on the inner peripheral surface and the inner bottom surface of the cup-shaped bearing 203, and the shaft member 202 is inserted into the inner periphery of the bearing 203. Between the inner bottom surface 204c of the metal part 204 and the forward end of the convex spherical portion 202b of the shaft member 202, there is formed the thrust bearing portion T contact-supporting the shaft member 202 in the thrust direction. As shown, for example, in FIG. 18, the oil feeding member 206 may be arranged at a position where it is in contact with the outer surface of the metal part 204. Apart from this, the oil feeding member 206 may be provided at a position where it is in contact with the lower end surface 204d of the bottom portion of the metal part 204. Alternatively, it is also possible to arrange the oil feeding member 206 within the resin part 205 so as to be radially spaced apart from the metal part 204, allowing it to communicate with the bearing gap through the communication hole 217.

Figure 19:
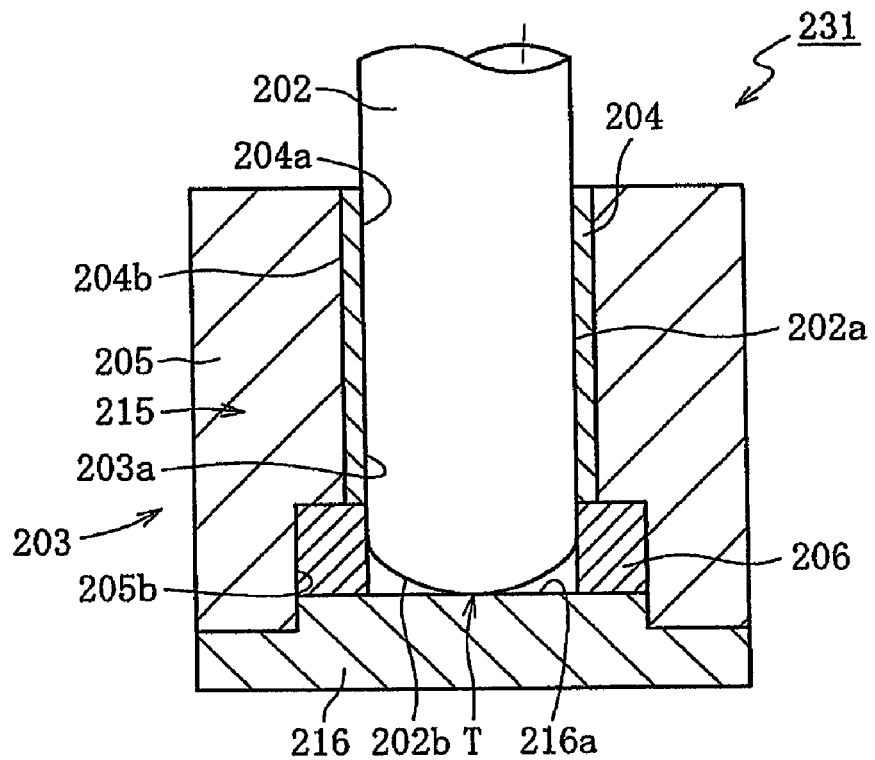
FIG. 19 is a sectional view of a bearing device 231.

In a bearing device 231 shown in FIG. 19, the side portion 215 and the bottom portion 216 of the cup-shaped bearing 203 are formed as separate members. The side portion 215 is formed by resin injection molding, and has a large diameter inner peripheral surface 205b and a small diameter inner peripheral surface. The oil feeding member 206 is arranged on the large diameter inner peripheral surface 205b of the resin part 205. The bottom portion 216 is formed, for example, of a metal material, and is fixed to the side portion 215 by bonding, high-frequency fusion-bonding, ultrasonic fusion-bonding or the like. Between the forward end of the convex spherical portion 202b of the shaft member 202 and the upper end surface 216a of the bottom portion 216, there is formed the thrust bearing portion T contact-supporting the shaft member 202 in the thrust direction. In this case, apart from providing the oil feeding member 206 on the side portion 215 side as shown in FIG. 19, it is also possible to provide the oil feeding member 206 on the bottom portion 216.

Next, a forth embodiment of the present invention will be described with reference to FIGS. 20 through 24.

In this embodiment, a resin part 315 of a bearing 305 is formed of an oil-containing resin. The bearing 305 (see FIG. 22) is produced by the step of performing masking on a portion of a master shaft 302 where it is required, the step of forming an electrocast shaft 301 by performing electroforming on the non-masked portion (see FIG. 20), the step of performing resin injection molding on a metal part 304 of the electrocast shaft 301 (see FIG. 21), and the step of separating the metal part 304 and the master shaft 302 from each other.

The master shaft 302 is formed of a conductive material such as stainless steel that has undergone quenching, and is formed as a straight shaft with a circular cross-sectional configuration. Of course, the material is not restricted to stainless steel; there is selected a material satisfying the requisite properties in terms of the function of the bearing and of the convenience in the production of the bearing, such as mechanical strength like rigidity, slidability, heat resistance, chemical resistance, and workability and releasability of the metal part 304; further, a heat treatment method is selected. A non-metal material such as ceramic can also be used by performing conduction treatment thereon (e.g., by forming a conductive metal film thereon). It is desirable to perform on the surface of the master shaft 302 surface treatment for reducing the frictional force between itself and the metal part 304, for example, resin coating with a fluorine-based resin.

The master shaft 302 may be a solid shaft, a hollow shaft, or a solid shaft with a hollow portion filled with resin. In the case of a rotary bearing, the master shaft is basically formed in a circular cross-sectional configuration, whereas, in the case of a sliding bearing, the bearing may be formed in an arbitrary cross-sectional configuration; apart from a circular one, it may have a polygonal or a non-round sectional configuration. While in the case of a sliding bearing, the cross-sectional configuration of the master shaft 302 is basically the same in the axial direction, in the case of a rotary bearing and a rotary sliding bearing, the cross-sectional configuration thereof may not be fixed over the entire length of the shaft.

The surface precision of the outer peripheral surface of the master shaft 302 directly influences the precision of the bearing gap described below, so it is necessary to previously finish with high accuracy the surface precision that is important in terms of bearing function, such as roundness, cylindricality, and surface roughness. For example, in the case of a rotary bearing, roundness is regarded as important from the viewpoint of avoiding contact with the bearing surface, so it is necessary to enhance as much as possible the roundness of the outer peripheral surface of the master shaft 302. For example, it is desirable to effect finishing to a level of not more than 80% of the average width (radial dimension) of the bearing gap described below. Thus, when, for example, setting the average width of the bearing gap to 2 μm, it is desirable for the outer peripheral surface of the master shaft to be finished to a roundness of 1.6 μm or less.

Figure 20:
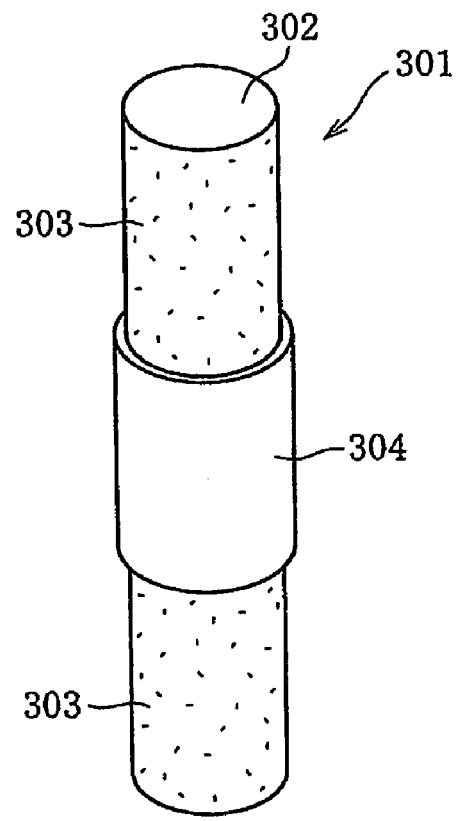
FIG. 20 is a perspective view of an electrocast shaft 301.

Masking is effected, as indicated by the dotted pattern of FIG. 20, on the outer peripheral surface of the master shaft 302 except for the portion where the metal part 304 is to be formed. As a covering material 303 for the masking, there is selected and used an existing product having non-conductivity and corrosion resistance with respect to electrolyte solution.

To perform electroforming, the master shaft 302 is immersed in an electrolyte solution containing ions of metals such as Ni and Cu, and electricity is supplied to the electrolyte solution to cause the target metal to be deposited on the surface of the master shaft 302. The electrolyte solution may contain as needed a sliding material such as carbon or stress mitigating material such as saccharin. The electro-deposited metal is selected as appropriate according to the physical and chemical properties required of the bearing surface of the bearing, such as hardness, wear resistance, and fatigue strength. If the thickness of the metal part 304 is too large, its separability from the master shaft 302 deteriorates, whereas, if it is too small, that will lead to a reduction in the durability of the bearing surface, etc.; thus, the metal part is set to an optimum thickness according the to the requisite bearing performance, bearing size, use, etc. For example, in the case of a rotary bearing of a shaft diameter of 1 mm to 6 mm, it is desirable for the thickness to range from 10 μm to 200 μm.

Through the above process, there is produced, as shown in FIG. 20, the electrocast shaft 301 with the cylindrical metal part 304 attached to the outer periphery of the master shaft 302. When the covering material 303 for masking is thin, both ends of the metal part 304 may protrude toward the covering material 303, forming tapered beveled portions on the inner peripheral surface thereof. By utilizing the beveled portions, it is also possible to form flange portions for preventing detachment of the metal part from the resin part. In this embodiment as described here, no such beveled portions are formed.

Figure 21:
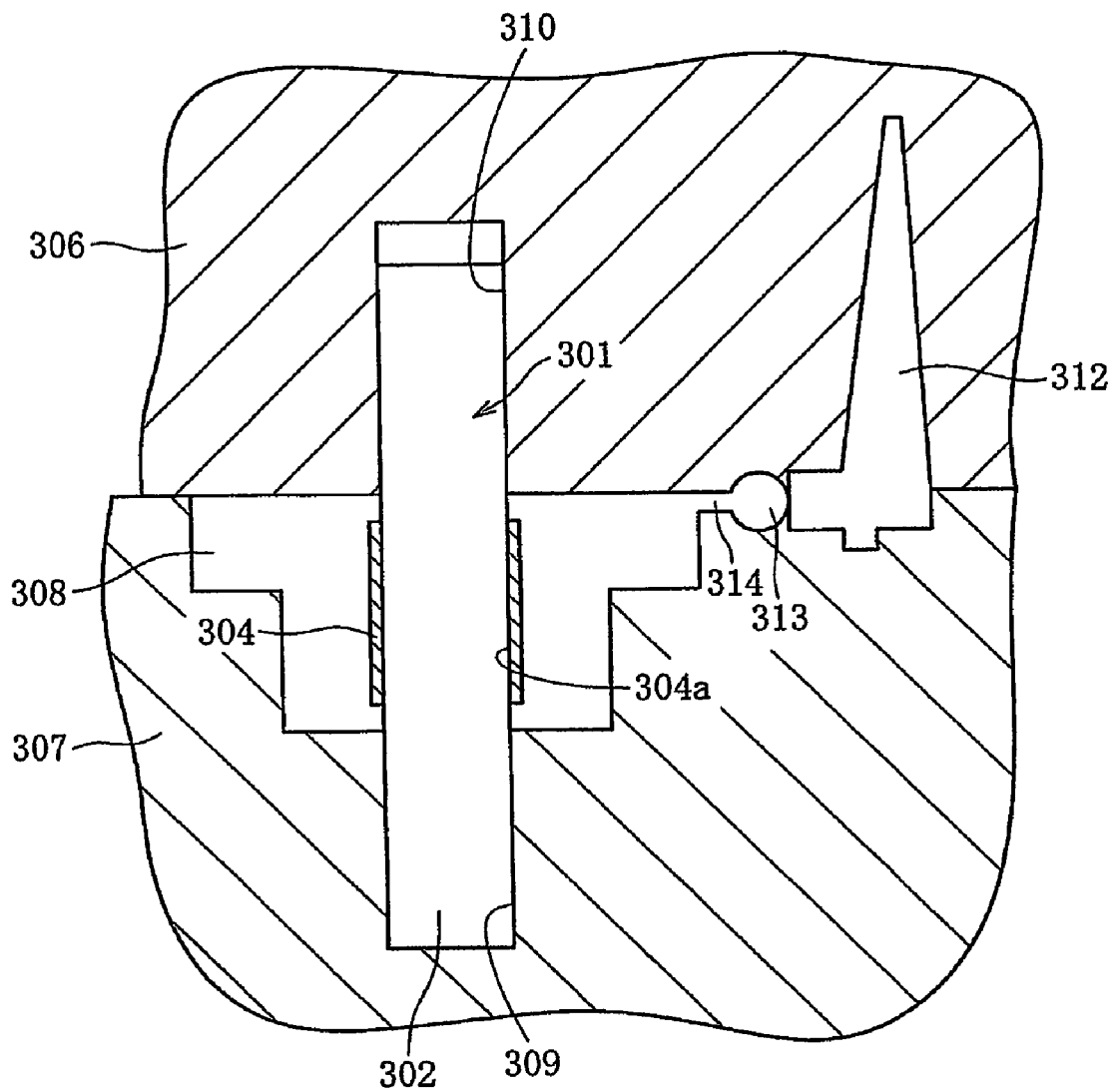
FIG. 21 is a sectional view of the electrocast shaft 301 as set in a mold for injection molding.

The electrocast shaft 301 is transferred to the injection molding step shown in FIG. 21, where there is conducted insert molding using the metal part 304 and the master shaft 302 as the insert components.

As shown in FIG. 21, in this injection molding process, the electrocast shaft 301 is supplied into a mold including a movable mold portion 306 and a stationary mold portion 307, with the axial direction thereof being parallel to the clamping direction (the vertical direction as seen in the drawing). The stationary mold portion 307 has a positioning hole 309 adapted to the outer diameter dimension of the master shaft 302. The lower end of the electrocast shaft 301 transferred from the pre-process is inserted into the positioning hole 309 to perform positioning on the electrocast shaft 301. The movable mold portion 306 has a guide hole 310 that is coaxial with the positioning hole 309. When the movable mold portion 306 is brought close to the stationary mold portion 307 to perform clamping, the upper end of the electrocast shaft 301 is first inserted into the guide hole 310 to effect centering on the electrocast shaft 301; then, the movable mold portion 306 is brought closer to the stationary mold portion 307 until they are held in contact with each other, when the clamping is completed.

In this embodiment, at the time of completion of the clamping shown in FIG. 21, the lower end of the electrocast shaft 301 abuts the lower end of the positioning hole 309, and the upper end of the metal part 304 is situated below the upper end of the molding surface, with the lower end of the metal part 304 being situated above the lower end of the molding surface. That is, the axial dimension of the metal part 304 is set smaller than the axial dimension of the molding surface. In this state, resin material is injected into a cavity 308 through a sprue 312, a runner 313, and a gate 314 to perform insert molding.

As the resin material for the injection molding process, an oil-containing resin is used. As the oil-containing resin, it is possible to use, for example, one which is solidified (cured) in a state in which a lubricant component (lubricant oil or lubricant grease) is held while dispersed therein; there are no particular limitations regarding the component resin, the kind of lubricant oil and lubricant grease to be adopted. Specific examples of such an oil-containing resin include thermoplastic resins such as ultra-high-molecular polyolefin, polyphenylene sulfide, and liquid crystal polymer; specific examples of the lubricant component include lubricant oils such as mineral oil, synthetic hydrocarbon oil, and ester oil. When thermoplastic resin is used as the resin, and lubricant grease is used as the lubricant component, it is desirable to adopt a lubricant grease exhibiting a dropping point higher than the melting point of the thermoplastic resin. It is possible to add to the resin materials, as needed, various kinds of filler material, such as a reinforcing material (which may be in the form of a fibrous material, a powder-like material, etc.) and a stress mitigating material.

The oil-containing resin that can be used in the present invention is not restricted to the ones mentioned above; for example, it is possible to use a porous resin, impregnated with lubricant oil, obtained by mixing a resin with a water-soluble additive such as sodium chloride or sodium sulfide and immersing it in water after molding to dissolve the additive. In this case, in order that the impregnation lubricant oil may not leak to the periphery, it is desirable to perform sealing on the surface except for the portion through which lubricant oil is supplied to the bearing gap. Examples of the sealing means that may be adopted include impregnation of exposed voids with resin or the like, and surface coating through formation of a metal plating film of nickel or the like. Apart from this, it is also possible to use a resin mixed with oil-containing porous particles.

Figure 22:
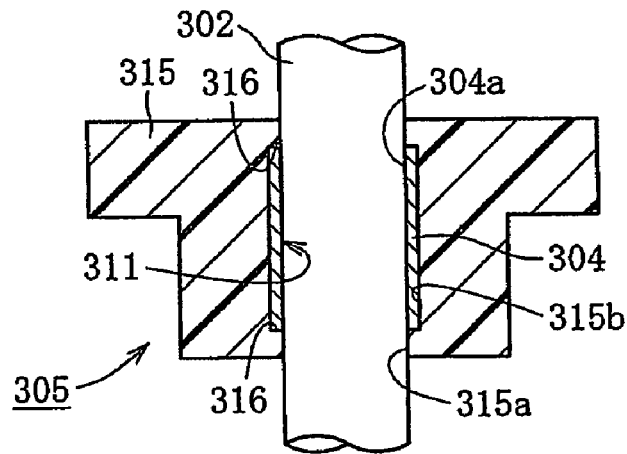
FIG. 22 is a sectional view of a sliding bearing 305 according to a fourth embodiment of the present invention.
Figure 23:
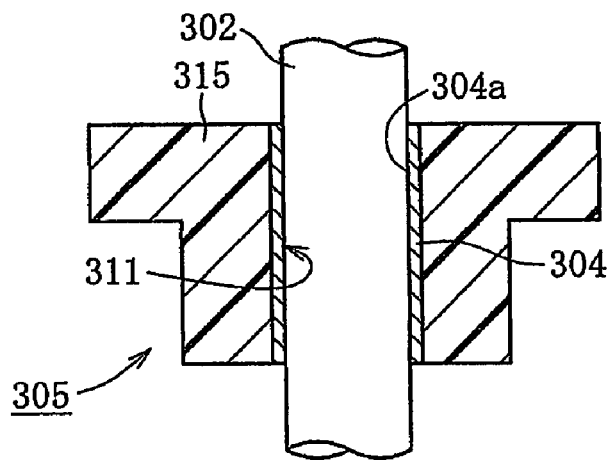
FIG. 23 is a sectional view of another example of the bearing 305.

As shown in FIG. 22, the molding obtained through releasing after opening the mold has a structure in which the master shaft 302, the metal part 304, and the resin part 315 are integrated. This molding is thereafter transferred to the separation process, where it is separated into a bearing 305 including the metal part 304 and the resin part 315, and the master shaft 302.

In the separating step, the inner stress accumulated in the metal part 304 is released, whereby the inner peripheral surface of the metal part 304 is diverged to thereby separate the metal part 304 from the outer peripheral surface of the master shaft 302. The releasing of the inner stress is effected by imparting an impact to the master shaft 302 or the bearing 305, or by imparting an axial pressurizing force between the inner peripheral surface of the metal part 304 and the outer peripheral surface of the master shaft 302. By releasing the inner stress, the inner peripheral surface of the metal part 304 is radially diverged to thereby form a gap of an appropriate size between the inner peripheral surface of the metal part 304 and the outer peripheral surface of the master shaft 302, whereby the master shaft 302 can be smoothly released in the axial direction from the inner peripheral surface of the metal part 304; as a result, the molding is separated into the bearing 305 formed of the metal part 304 and the resin part 315, and the master shaft 302. The amount by which the metal part 304 diverges can be controlled by varying, for example, the thickness of the metal part 304.

In a case in which the inner periphery of the metal part 304 cannot be diverged to a sufficient degree solely by imparting an impact, it is possible to separate the bearing 305 from the master shaft 302 by heating or cooling the metal part 304 and the master shaft 302 and generating a difference in thermal expansion amount therebetween.

A separately produced shaft member is inserted into the inner periphery of the bearing 305 thus formed, and the bearing gap between the inner peripheral surface of the bearing 305 and the outer peripheral surface of the shaft member is filled with lubricant oil, whereby a bearing device (not shown) is completed.

As shown in FIG. 22, in this embodiment, the inner peripheral surface of the bearing 305 is formed by the inner peripheral surface 304a of the metal part 304 and a small diameter inner peripheral surface 315a of the resin part 315, and the inner peripheral surface 304a of the metal part 304 functions as the bearing surface 311. The composition of the resin material and the molding conditions are determined such that the small diameter inner peripheral surface 315a of the resin part 315 diverges through molding shrinkage at the time of curing after the injection molding, whereby it is possible to form a minute gap between this inner peripheral surface and the outer peripheral surface of the master shaft 302. As a result, it is possible to easily separate the resin part 315 and the master shaft 302 from each other. In the bearing device with the shaft member being inserted into the inner periphery of the bearing thereof, when the width of the minute gap is of an appropriate size, the minute gap between the small diameter inner peripheral surface 315a of the resin part 315 and the outer peripheral surface of the shaft member can function as a capillary seal, which is effective in preventing lubricant oil from flowing out of the bearing gap. Alternatively, it is also possible to form the small diameter inner peripheral surface 315a by machining or the like after the separation of the master shaft 302.

In this way, apart from diverging the small diameter inner peripheral surface 315a of the resin part 315, the capillary seal can be formed by forming a small diameter outer peripheral surface (not shown) on the outer peripheral surface of the shaft member opposed to the small diameter inner peripheral surface 315a. Further, when the capillary seal is formed as a tapered seal gradually reduced in diameter toward the bearing gap, it is possible to more effectively prevent the lubricant oil from flowing out.

The master shaft 302 is used as the shaft member. In this case, the minute gap between the inner peripheral surface of the metal part 304 and the master shaft 302 formed in the step of separating the metal part 304 from the master shaft 302 functions as a bearing gap. Due to the characteristics of electroforming, this bearing gap is of a very small clearance and high precision, so it helps to provide a bearing of high rotational accuracy or slidability. As described above, in the case of forming a bearing through replacement with a shaft member produced separately, once produced, the master shaft 302 can be repeatedly used, so it is possible to restrain an increase in the production cost for the master shaft 302, making it possible to produce the bearing device 305 at a still lower cost.

The resin part 315 formed of an oil-containing resin impregnated with oil partially faces the bearing gap, so, during operation (rotation, sliding, rotary sliding, or rocking) of the bearing 305, oil oozing out of the resin part 315 forms an oil film between the bearing surface 311 and the outer peripheral surface of the shaft member. Thus, lubricant oil always exists abundantly in the bearing gap, so it is possible to avoid noise generation due to defective lubrication caused by shortage of oil, and wear due to contact sliding between the shaft member and the bearing 305, thereby attaining an increase in product life.

Further, step portions 316 formed between the small diameter inner peripheral surface 315a and the large diameter inner peripheral surface 315b of the resin part 315 are engaged with the upper end and the lower end of the metal part 304, whereby it is possible to obtain an anchor effect, which helps to prevent axial detachment of the metal part.

The fourth embodiment of the present invention is not restricted to the form described above. For example, by adjusting the axial dimension of the metal part 304 formed by performing electroforming on the master shaft 302, and the configuration of the molds 306 and 307, it is possible to form the entire inner peripheral surface of the bearing 305 by the metal part 304 (see FIG. 23). In this case, the resin part 315 formed of an oil-containing resin does not face the bearing gap; however, oil oozing out of the resin reaches the bearing gap by way of the upper end or the lower end of the metal part 304, so the same lubricating effect as that described above can be obtained.

Figure 24:
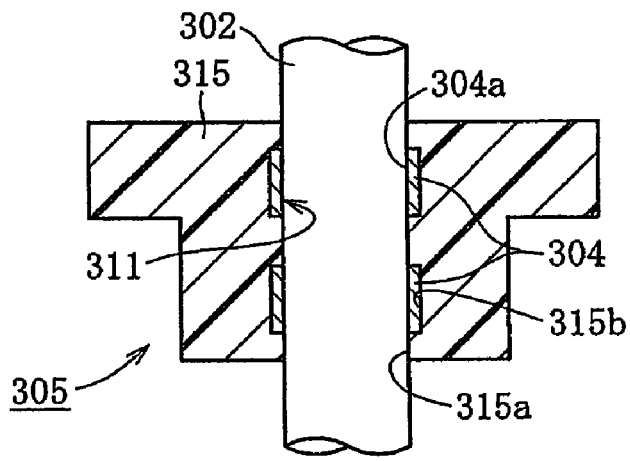
FIG. 24 is a sectional view of another example of the bearing 305.

In another example, it is possible to perform electroforming with a plurality of portions axially spaced apart from each other being masked, whereby there are provided on the inner peripheral surface of the bearing 305 a plurality of electrocast surfaces axially spaced apart from each other (see FIG. 24). By adopting this method, it is possible to form an electrocast surface solely in a portion where it is required (e.g., the portion where dynamic pressure grooves are formed), so it is possible to achieve a reduction in cost. Further, if the area of the portion of the resin part formed of oil-containing resin facing the bearing gap is enlarged, oil is easier to supply, thereby making it possible to achieve a further lubricating effect. Further, since the bearing surface 311 is formed at a plurality of positions axially spaced apart from each other, it is possible to enhance the bearing rigidity with respect to moment load.

As described above, a bearing according to any one of the first through fourth embodiments of the present invention can be used as a dynamic pressure bearing in which pressure is generated by a dynamic pressure action of a fluid in a radial bearing gap between the inner peripheral surface of a metal part and the outer peripheral surface of a shaft member. This dynamic pressure bearing can be formed, for example, by forming on the outer peripheral surface of a shaft member a dynamic pressure generating portion such as dynamic pressure grooves of a herringbone-like configuration or the like, a multi-arc surface, or a step surface, and opposing this dynamic pressure generating portion to the cylindrical inner peripheral surface of the metal part . Conversely, it is also possible to form the dynamic pressure generating portion on the inner peripheral surface of the metal part; in this case, the dynamic pressure generating portion of the inner peripheral surface of the metal part can be formed by performing electroforming to form on the outer peripheral surface of a master shaft a pattern corresponding to the configuration of the dynamic pressure generating portion. After that, the bearing and the master shaft are separated from each other by similar procedures, and, further, a shaft member with a cylindrical outer peripheral surface is inserted into the inner periphery of the bearing, whereby a dynamic pressure bearing is formed.

A dynamic pressure bearing can also be adopted for a thrust bearing portion of a bearing device. In this case, a shaft member having a lower end surface is used, and there is formed a dynamic pressure generating portion formed of spiral dynamic pressure grooves, a step surface or the like formed on the lower end surface of the shaft member; this dynamic pressure generating portion is opposed to a surface facing the lower end surface of the shaft member, for example, the inner bottom surface of the metal part, whereby it is possible to form a thrust bearing portion. Conversely, it is also possible to form the dynamic pressure generating portion on the inner bottom surface of the metal part.

The bearing device described above can be incorporated into the motor, for example, of an information apparatus. In the following, an example in which the bearing device 1 is used as a rotation shaft support device for the above-mentioned motor will be described with reference to FIG. 25.

Figure 25:
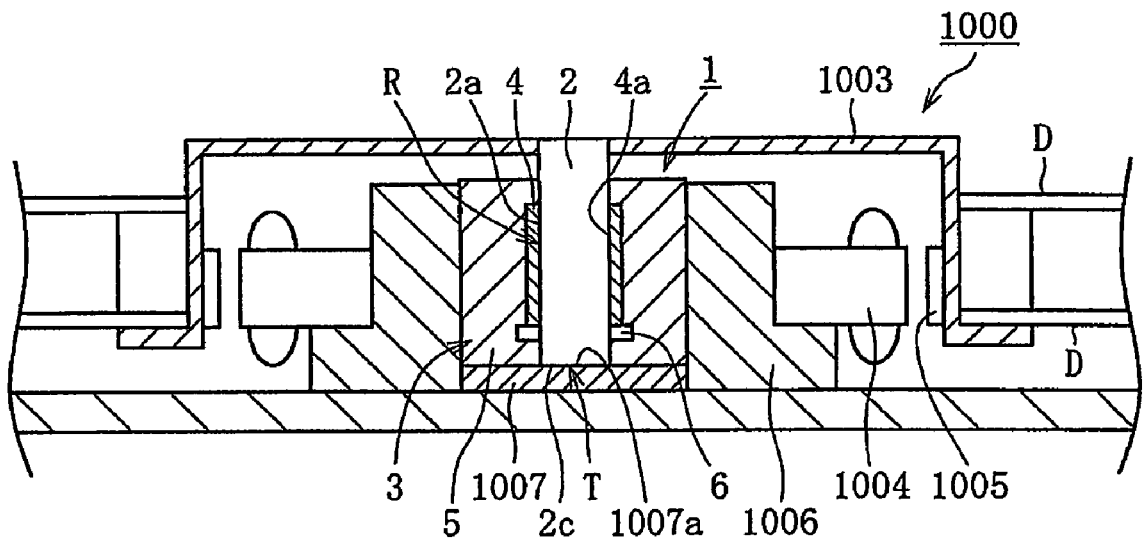
FIG. 25 is a sectional view of a motor 1000 to which the present invention is applied.

As shown in FIG. 25, a motor 1000 is used as the spindle motor of a disk drive device such as an HDD, and is equipped with the bearing device 1 rotatably supporting the shaft member 2 in a non-contact fashion, a rotor (disk hub) 1003 attached to the shaft member 2, and a stator coil 1004 and a rotor magnet 1005 that are opposed to each other through the intermediation, for example, of a radial gap. The stator coil 1004 is attached to the outer periphery of a bracket 1006, and the rotor magnet 1005 is attached to the inner periphery of the disk hub 1003. One or a plurality of disks D such as magnetic disks are retained by the disk hub 1003. When the stator coil 1004 is energized, the rotor magnet 1005 is rotated by an electromagnetic force between the stator coil 1004 and the rotor magnet 1005, whereby the disk hub 1003 and the disks D retained by the disk hub 1003 rotate integrally with the shaft member 2.

In this embodiment, the bearing device 1 is equipped with the bearing 3, the shaft member 2 inserted into the inner periphery of the bearing 3, and a thrust plate 1007 attached to one end of the bearing 3. While in the example shown in FIG. 25 the bearing device 1 shown in FIG. 1 is used, bearing devices according to other embodiments of the present invention are also applicable. On the upper end surface of the thrust plate 1007, there is formed, as the thrust dynamic pressure generating portion, a region (thrust bearing surface) 1007a on which a plurality of dynamic pressure grooves are arranged in a spiral fashion. During rotation of the shaft member 2, an oil film is formed in the radial bearing gap between the outer peripheral surface 2a of the shaft member 2 and the inner peripheral surface 4a of the metal part 4 constituting the radial bearing surface of the bearing 3, whereby there is formed a radial bearing portion R supporting the shaft member 2 radially and rotatably in a non-contact fashion. At the same time, in the thrust bearing gap between the lower end surface 2c of the shaft member 2 and the upper end surface 1007a of the thrust plate 1007, there is formed a thrust bearing portion T rotatably supporting the shaft member 2 in the thrust direction in a non-contact fashion by a dynamic pressure action of lubricant oil due to the dynamic pressure grooves.

Apart from the above example, the bearing device of the present invention can also be suitably used as a rotation shaft support means in, for example, a small motor for information apparatus rotated at high speed like a spindle motor for a magneto-optical disk drive for optical disks, or in a polygon scanner motor for a laser beam printer or the like. Further, it is also applicable to a fan motor or the like of which long service life is required.

While in the above-mentioned example the bearing is used to support a rotation shaft, the bearing is also applicable as a sliding bearing for supporting linear relative sliding movement between itself and a shaft, as a rotary sliding bearing for supporting both relative sliding movement and relative rotational movement, or as a rocking bearing for supporting three-dimensional movement of a shaft.

The invention claimed is:

1. A bearing device comprising:
a sliding bearing including a metal part formed by electroforming and a resin part formed by molding with the metal part located at an inner periphery of the resin part;
a shaft member inserted into an inner periphery of the sliding bearing, with a bearing gap being formed between an inner peripheral surface of the sliding bearing and an outer peripheral surface of the shaft member; and
an oil sump for supplying oil to the bearing gap, wherein the metal part has a cup-like configuration with a thickness in a range from 10 to 200 µm, an inner peripheral surface and an inner bottom surface of the metal part are a surface deposited on a surface of a master shaft, and the inner peripheral surface of the metal part is a bearing surface,
the shaft member has a convex spherical portion at a lower end thereof,
a thrust bearing portion supporting the shaft member in a thrust direction is formed between the convex spherical portion of the shaft member and the inner bottom surface of the metal part, and
the oil sump is formed between the convex spherical portion of the shaft member and the inner peripheral surface and the inner bottom surface of the metal part.

* * * * *